US012689752B2

(12) United States Patent
Song et al.

(10) Patent No.: US 12,689,752 B2
(45) Date of Patent: Jul. 21, 2026

(54) PICTURE ENCODING AND PICTURE DECODING WITH SELECTIVE DECODED PICTURE BUFFER STORAGE BASED ON REFERENCE LAYER NUMBER SETS

(71) Applicant: Huawei Technologies Co., Ltd., Shenzhen (CN)

(72) Inventors: Yi Song, Shenzhen (CN); Yixuan Zhang, Singapore (SG); Peiyun Di, Shenzhen (CN); Shaolin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 18/647,534

(22) Filed: Apr. 26, 2024

(65) Prior Publication Data

US 2024/0275995 A1 Aug. 15, 2024

Related U.S. Application Data

(63) Continuation of application No. PCT/CN2022/127363, filed on Oct. 25, 2022.

(30) Foreign Application Priority Data

Oct. 27, 2021 (CN) .......................... 202111256754.X

(51) Int. Cl.
*H04N 19/30* (2014.01)
*H04N 19/172* (2014.01)
(52) U.S. Cl.
CPC .......... *H04N 19/30* (2014.11); *H04N 19/172* (2014.11)

(58) Field of Classification Search
None
See application file for complete search history.

(56) References Cited

U.S. PATENT DOCUMENTS

| 8,275,051 B2 | 9/2012 | Hannuksela et al. |
| 2015/0245034 A1* | 8/2015 | Terada ................. H04N 19/105 |
| | | 375/240.02 |
| 2021/0120232 A1* | 4/2021 | Srikantam ............ H04N 19/172 |

FOREIGN PATENT DOCUMENTS

CN 114071144 A 2/2022

OTHER PUBLICATIONS

ISO/IEC 14496-10, Information technology-Coding of audio-visual objects-Part 10: Advanced Video Coding, Jan. 10, 2004, total 280 pages.

(Continued)

*Primary Examiner* — Stuart D Bennett
(74) *Attorney, Agent, or Firm* — Conley Rose, P.C.

(57) ABSTRACT

A picture encoding method includes: determining a reference frame number of a current picture based on channel feedback information, where the channel feedback information indicates information about a picture frame received by a decoder side; obtaining a first reference layer number set of a first picture frame corresponding to the reference frame number, where the first reference layer number set includes layer numbers of N1 layers, $1 \leq N1 < L1$, and L1 indicates a total quantity of layers of the first picture frame; determining a reference layer number of the current picture based on the channel feedback information and the first reference layer number set; and performing video encoding on the current picture based on the reference frame number and the reference layer number to obtain a bitstream.

20 Claims, 9 Drawing Sheets

(56) References Cited

OTHER PUBLICATIONS

ISO/IEC 23008-2, Information technology-High efficiency coding and media delivery in heterogeneous environments- Part 2: High efficiency video coding, Dec. 1, 2013, total 13 pages.

Jianle Chen, Qualcomm et al.: High efficiency video coding (HEVC) scalable extension Draft 7, Joint Collaborative Team on Video Coding (JCT-VC) of ITU-T SG 16 WP 3 and ISO/IEC JTC 1/SC 29/WG 11, JCTVC-R1008v7, 18th Meeting: Sapporo, JP, Jun. 30-Jul. 9, 2014, total 175 pages.

ITU-T H.264, Series H: Audiovisual and Multimedia Systems Infrastructure of audiovisual services—Coding of moving video Advanced video coding for generic audiovisual services, Telecommunication Standardization Sector of ITU (Jun. 2019), total 836 pages.

ITU-TH.265, Series H: Audiovisual and Multimedia Systems Infrastructure of audiovisual services—Coding of moving video High efficiency video coding, Telecommunication Standardization Sector of ITU (Nov. 2019), total 712 pages.

* cited by examiner

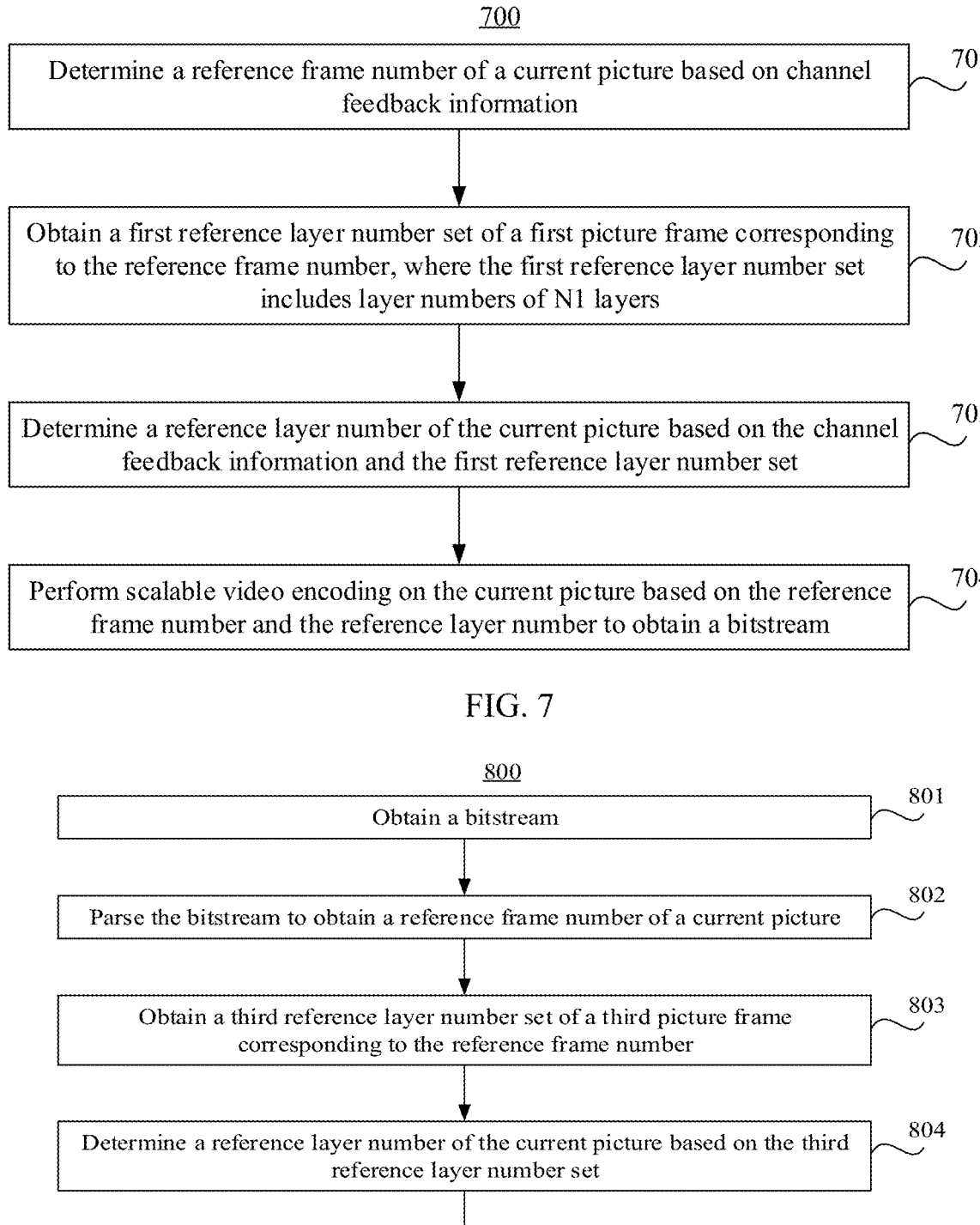

700

| 701 Determine a reference frame number of a current picture based on channel feedback information |

702 Obtain a first reference layer number set of a first picture frame corresponding to the reference frame number, where the first reference layer number set includes layer numbers of N1 layers 703 Determine a reference layer number of the current picture based on the channel feedback information and the first reference layer number set 704 Perform scalable video encoding on the current picture based on the reference frame number and the reference layer number to obtain a bitstream

801 Obtain a bitstream

802 Parse the bitstream to obtain a reference frame number of a current picture

803 Obtain a third reference layer number set of a third picture frame corresponding to the reference frame number 804 Determine a reference layer number of the current picture based on the third reference layer number set 805 Perform video decoding based on the reference frame number and the reference layer number to obtain a reconstructed picture of the current picture

FIG. 8

PICTURE ENCODING AND PICTURE DECODING WITH SELECTIVE DECODED PICTURE BUFFER STORAGE BASED ON REFERENCE LAYER NUMBER SETS

CROSS-REFERENCE TO RELATED APPLICATIONS

This is a continuation of International Patent Application No. PCT/CN2022/127363 filed on Oct. 25, 2022, which claims priority to Chinese Patent Application No. 202111256754.X filed on Oct. 27, 2021. The disclosures of the aforementioned applications are hereby incorporated by reference in their entireties.

TECHNICAL FIELD

This disclosure relates to video encoding and decoding technologies, and in particular, to a picture encoding method and apparatus, and a picture decoding method and apparatus.

BACKGROUND

Scalable video coding, also known as layered video coding, is an extended coding standard of a current video coding standard. In the scalable video coding, spatial domain scaling (resolution scaling), temporal domain scaling, or quality scaling is performed on an encoder to form different bitstream layers, so that a bitstream includes video bitstreams of different resolutions, different frame rates, or different bit rates.

The encoder may encode a video frame into a base layer bitstream and an enhancement layer bitstream based on different encoding configurations. A base layer generally encodes a bitstream of a lowest layer in spatial domain or temporal domain, or with lowest quality. An enhancement layer uses the base layer as a basis, and superimposes and encodes a bitstream of a higher layer in spatial domain or temporal domain, or with higher quality. As a quantity of enhancement layers increases, a spatial domain level, temporal domain level, or quality level of coding also increases. During transmission, transmission of the base layer bitstream is preferably ensured. When a network has a margin, enhancement layer bitstreams of increasingly high layers are gradually transmitted. A decoder first receives and decodes the base layer bitstream, gradually decodes, based on received bitstreams of enhancement layers from a low layer to a high layer, bitstreams of increasingly high levels in spatial domain, temporal domain, or quality, superimposes information of a high level to a low level, to obtain a reconstructed video frame with a high resolution, a high frame rate, or high quality.

However, a scalable coding scheme in a conventional technology is affected by a change of a channel condition, resulting in an artifact.

SUMMARY

This disclosure provides a picture encoding method and apparatus, and a picture decoding method and apparatus, to fully consider a change of a channel, and ensure that reference pictures used by an encoder side and a decoder side are consistent, so as to improve encoding efficiency, and avoid an artifact.

According to a first aspect, this disclosure provides a picture encoding method, including determining a reference frame number of a current picture based on channel feed-back information, where the channel feedback information indicates information about a picture frame received by a decoder side, obtaining a first reference layer number set of a first picture frame corresponding to the reference frame number, where the first reference layer number set includes layer numbers of N1 layers, $1 \leq N1 < L1$, and L1 indicates a total quantity of layers of the first picture frame, determining a reference layer number of the current picture based on the channel feedback information and the first reference layer number set, and performing video encoding on the current picture based on the reference frame number and the reference layer number to obtain a bitstream.

The channel feedback information indicates the information about the picture frame received by the decoder side. For example, a total quantity of layers of a current picture frame is 4, and an encoder side encodes the current picture frame to obtain bitstreams corresponding to four layers. However, during transmission, a decoder side receives only bitstreams corresponding to first three layers of the current picture frame. In this case, when encoding a next frame, the encoder side uses a reconstructed picture of a $4^{th}$ layer of the current picture as a reference picture, but the decoder side does not receive a bitstream corresponding to the $4^{th}$ layer. Therefore, the decoder side cannot decode the next frame by using the reconstructed picture of the $4^{th}$ layer of the current picture as a reference picture. As a result, the next frame cannot be decoded normally. Therefore, in this disclosure, an encoder side first obtains the channel feedback information, determines, based on the channel feedback information, the information about the picture frame received by the decoder side, for example, the channel feedback information includes a frame number and a layer number of the picture frame received by the decoder side, and then determines a reference frame of a next frame based on the information about the picture frame received by the decoder side. This avoids the case in the foregoing example, and ensures that reference pictures used by the encoder side and the decoder side are consistent.

In this disclosure, a maximum quantity of layers $L_{max}$ of a picture frame in a video during scalable encoding may be preset. For example, $L_{max}=6$. The maximum quantity of layers may be a threshold. In other words, a quantity of layers of each picture frame during layering does not exceed the quantity of layers. However, during actual encoding, for different picture frames, different total quantities of layers may be obtained. The total quantity of layers of the first picture frame is indicated by L1, and L1 may be less than or equal to the foregoing maximum quantity of layers $L_{max}$. After the first picture frame is divided into L1 layers, the N1 layers of the L1 layers may be used as reference pictures of a subsequent picture frame, where $1 \leq N1 < L1$. The layer numbers of the N1 layers form the first reference layer number set of the first picture frame. In other words, the first picture frame corresponds to the first reference layer number set, and only a reconstructed picture of a layer whose layer number is in the first reference layer number set can be used as the reference frame of the subsequent picture frame. Another picture frame in the video is similar. Details are not described herein again.

After the reference frame number and the reference layer number of the current picture are determined, a reconstructed picture corresponding to the reference frame number and the reference layer number may be extracted from a decoded picture buffer (DPB) as a reference picture of the current picture. Therefore, scalable encoding is performed on the current picture based on the reference picture to obtain a bitstream.

In this disclosure, the reference frame number of the current picture is determined based on the channel feedback information, and then the reference layer number of the current picture is determined based on the reference frame number and a preset reference layer number set. The reference layer number set includes layer numbers of N layers of a picture frame corresponding to the reference frame number. Then, the reference picture of the current picture is obtained based on the reference frame number and the reference layer number. In this way, for the obtained reference picture, a change of a channel is fully considered, that the reference pictures used by the encoder side and the decoder side are consistent is ensured, to improve encoding efficiency, and avoid artifacts.

In a possible implementation, performing video encoding on the current picture based on the reference frame number and the reference layer number to obtain a bitstream includes obtaining, from a DPB, a reconstructed picture corresponding to the reference frame number and the reference layer number, where the DPB stores only reconstructed pictures of the N1 layers for the first picture frame, and using the obtained reconstructed picture corresponding to the reference frame number and the reference layer number as a reference picture, and performing video encoding on the current picture based on the reference picture to obtain the bitstream.

The DPB stores only the reconstructed pictures of the N1 layers for the first picture frame, instead of storing reconstructed pictures of all L1 layers of the first picture frame. This can save storage space of the DPB, and improve encoding efficiency.

In a possible implementation, when there is only one decoder side, determining a reference frame number of a current picture based on channel feedback information includes obtaining a plurality of pieces of channel feedback information, where the channel feedback information indicates a frame number of a picture frame received by the decoder side, and determining, as the reference frame number of the current picture, a frame number that is in a plurality of frame numbers indicated by the plurality of pieces of channel feedback information and that is closest to a frame number of the current picture.

In a possible implementation, determining a reference layer number of the current picture based on the channel feedback information and the first reference layer number set includes determining, as a target layer number, a highest layer number indicated by channel feedback information indicating the reference frame number, and when the first reference layer number set includes the target layer number, determining the target layer number as the reference layer number of the current picture, or when the first reference layer number set does not include the target layer number, determining, as the reference layer number of the current picture, a layer number that is in the first reference layer number set and that is less than and closest to the target layer number.

In a possible implementation, when there are a plurality of decoder sides, determining a reference frame number of a current picture based on channel feedback information includes obtaining a plurality of groups of channel feedback information, where the plurality of groups of channel feedback information correspond to the plurality of decoder sides, each group of channel feedback information includes a plurality of pieces of channel feedback information, and the channel feedback information indicates a frame number of a picture frame received by a corresponding decoder side, determining one or more common frame numbers based on the plurality of groups of channel feedback information, where the common frame number is a frame number indicated by at least one piece of channel feedback information in each group of channel feedback information, and determining the reference frame number of the current picture based on the one or more common frame numbers.

In this disclosure, a highest layer number indicated by channel feedback information indicating the common frame number may be determined as the target layer number. When the first reference layer number set includes the target layer number, the target layer number is determined as the reference layer number of the current picture, or when the first reference layer number set does not include the target layer number, the layer number that is in the first reference layer number set and that is less than and closest to the target layer number is determined as the reference layer number of the current picture.

The reference frame number determined based on the channel feedback information may not only meet a channel condition, but also may determine a received picture frame closest to the current picture as a reference frame, to improve encoding efficiency.

In a possible implementation, determining a reference layer number of the current picture based on the channel feedback information and the first reference layer number set includes obtaining a highest layer number indicated by channel feedback information that is in each of the plurality of groups of channel feedback information and that indicates the reference frame number, determining a smallest highest layer number among the plurality of highest layer numbers as a target layer number, and determining the reference layer number of the current picture based on the target layer number and the first reference layer number set.

In a possible implementation, the channel feedback information comes from a corresponding decoder side and/or a network device on a transmission link.

In a possible implementation, the channel feedback information is generated based on a sent bitstream.

In a possible implementation, determining a reference frame number of a current picture based on channel feedback information includes obtaining a plurality of pieces of channel feedback information, where the channel feedback information indicates the frame number of the picture frame received by the decoder side, determining, as a target frame number, a frame number that is in a plurality of frame numbers indicated by the plurality of pieces of channel feedback information and that is closest to a frame number of the current picture, and when a highest layer number indicated by channel feedback information indicating the target frame number is greater than or equal to a highest layer number in a second reference layer number set, determining the target frame number as the reference frame number, where the second reference layer number set is a reference layer number set of a second picture frame corresponding to the target frame number.

In a possible implementation, the method further includes, when the highest layer number indicated by the channel feedback information indicating the target frame number is less than the highest layer number in the second reference layer number set, determining, as the reference frame number of the current picture, a specified frame number in the plurality of frame numbers indicated by the plurality of pieces of channel feedback information.

In a possible implementation, the method further includes, when the first reference layer number set does not include the target layer number, if the first reference layer number set does not include a layer number less than the target layer number, determining a reference frame number of a previous frame of the current picture as the reference frame number of the current picture, and determining a reference layer number of the previous frame as the reference layer number of the current picture.

In a possible implementation, the bitstream further includes the first reference layer number set.

In a possible implementation, the bitstream further includes the reference frame number.

In a possible implementation, the bitstream further includes the reference frame number and the reference layer number.

In a possible implementation, when the current picture is a picture slice, the channel feedback information includes a picture slice number of the picture frame received by the decoder side and a layer number corresponding to the picture slice number, and determining a reference layer number of the current picture based on the channel feedback information and the first reference layer number set includes, if a picture slice number of the current picture is the same as the picture slice number of the picture frame received by the decoder side, determining, as a target layer number, a layer number corresponding to the picture slice number of the picture frame received by the decoder side, and when the first reference layer number set includes the target layer number, determining the target layer number as the reference layer number of the current picture, or when the first reference layer number set does not include the target layer number, determining, as the reference layer number of the current picture, a layer number that is in the first reference layer number set and that is less than and closest to the target layer number.

A frame of picture may be divided into a plurality of picture slices for encoding and sending. Therefore, when the current picture is the picture slice, in addition to the frame number of the picture frame received by the decoder side, the channel feedback information further includes the picture slice number of the picture frame received by the decoder side and the layer number corresponding to the picture slice number. In this way, the encoder side may first determine the reference frame number of the current picture by using the foregoing method, determine the reference layer number of the current picture based on the picture slice number of the current picture and the first reference layer number set, that is, find a same picture slice number as the picture slice number of the current picture from a plurality of picture slice numbers indicated by the channel feedback information indicating the reference frame number, determine a layer number corresponding to the same picture slice number as the target layer number, and determine the reference layer number of the current picture from the first reference layer number set based on the target layer number. For example, a reference frame number of a current picture is 1, a plurality of picture slice numbers indicated by channel feedback information indicating the frame number 1 include 1, 2, 3, and 4, the picture slice number 1 corresponds to a layer number 3, the picture slice number 2 corresponds to a layer number 4, the picture slice number 3 corresponds to a layer number 5, the picture slice number 4 corresponds to a layer number 6, and a first reference layer number set Rx is {1, 3, 5}. If a picture slice number of the current picture is 1, a reference layer number of the current picture is obtained based on the layer number 3 corresponding to the picture slice number 1 and the first reference layer number set, and the reference layer number of the current picture is 3. Alternatively, if a picture slice number of the current picture is 2, a reference layer number of the current picture is obtained based on the layer number 4 corresponding to the picture slice number 2 and the first reference layer number set, and the reference layer number of the current picture is 3. Alternatively, if a picture slice number of the current picture is 3, a reference layer number of the current picture is obtained based on the layer number 5 corresponding to the picture slice number 3 and the first reference layer number set, and the reference layer number of the current picture is 5. Alternatively, if a picture slice number of the current picture is 4, a reference layer number of the current picture is obtained based on the layer number 6 corresponding to the picture slice number 4 and the first reference layer number set, and the reference layer number of the current picture is 5.

According to a second aspect, this disclosure provides a picture decoding method, including obtaining a bitstream, parsing the bitstream to obtain a reference frame number of a current picture, obtaining a third reference layer number set of a third picture frame corresponding to the reference frame number, where the third reference layer number set includes layer numbers of N2 layers, $1 \leq N2 < L2$, and L2 indicates a total quantity of layers of the third picture frame, determining a reference layer number of the current picture based on the third reference layer number set, and performing video decoding based on the reference frame number and the reference layer number to obtain a reconstructed picture of the current picture.

In this disclosure, a decoder side may send channel feedback information when learning, through parsing, that a bitstream of a next frame starts to be received (determined based on a frame number in the bitstream), where the channel feedback information carries a frame number of a previous frame and a highest layer number received in the previous frame. Alternatively, a decoder side may send channel feedback information when learning, through parsing, that the current picture is completely received (determined based on a highest layer number of the current picture in the bitstream), where the feedback information carries a frame number of the current picture and a highest layer number received in the current picture. The decoder side sends the channel feedback information in the foregoing two cases, to ensure that a highest layer that is received in any frame and that is obtained by an encoder side is consistent with a highest layer of the same frame actually received by the decoder side. This avoids a problem that an error occurs in encoding and decoding because different reference pictures are used at the encoder side.

In a possible implementation, performing video decoding based on the reference frame number and the reference layer number to obtain a reconstructed picture of the current picture includes obtaining, from a DPB, a reconstructed picture corresponding to the reference frame number and the reference layer number, and using the obtained reconstructed picture corresponding to the reference frame number and the reference layer number as a reference picture, and performing video decoding based on the reference picture to obtain the reconstructed picture of the current picture.

In a possible implementation, the method further includes storing reconstructed pictures of N3 layers of the current picture in the DPB, where a fourth reference layer number set of the current picture includes layer numbers of M layers, the M layers include the N3 layers, $1 \leq M < L3$, and L3 indicates a total quantity of layers of the current picture, or storing a reconstructed picture of a highest layer among N3 layers in the DPB.

The fourth reference layer number set of the current picture may be obtained by parsing the bitstream. However, during decoding of the decoder side, a layer number L4 of a highest layer obtained for the current picture may be less than the total quantity of layers L3 of the current picture. Therefore, when the reconstructed picture of the current picture is stored in the DPB, if L4 is greater than or equal to a highest layer number in the M layers, N3=M, or if L4 is less than a highest layer number in the M layers, N3<M.

In a possible implementation, the method further includes displaying a reconstructed picture of an L4$^{th}$ layer of the current picture, where L4 indicates a layer number of a highest layer obtained by decoding the current picture.

In a possible implementation, determining a reference layer number of the current picture based on the third reference layer number set includes determining a highest layer number among layer numbers respectively corresponding to a plurality of reconstructed pictures that are obtained through decoding and that are of the third picture frame, and when the third reference layer number set includes the highest layer number, determining the highest layer number as the reference layer number of the current picture, or when the reference layer number set does not include the highest layer number, determining, as the reference layer number of the current picture, a layer number that is in the third reference layer number set and that is less than and closest to the highest layer number.

In a possible implementation, the method further includes, when the third reference layer number set does not include the highest layer number, if the third reference layer number set does not include a layer number less than the highest layer number, determining a reference frame number of a previous frame of the current picture as the reference frame number of the current picture, and determining a reference layer number of the previous frame as the reference layer number of the current picture.

In a possible implementation, the method further includes determining a frame number and a layer number of a received picture frame, and sending channel feedback information to an encoder side, where the channel feedback information indicates the frame number and the layer number of the received picture frame.

In a possible implementation, sending channel feedback information to an encoder side includes, when it is determined, based on a frame number in the bitstream, that a second frame starts to be parsed, sending the channel feedback information to the encoder side, where the channel feedback information indicates a frame number of a first frame and a layer number of a highest layer of the received first frame, and the first frame is a previous frame of the second frame, or when it is determined, based on the layer number of the received picture frame, that a first frame is completely received, sending the channel feedback information to the encoder side, where the channel feedback information indicates a frame number of the first frame and a layer number of a highest layer of the received first frame.

In a possible implementation, when the current picture is a picture slice, the method further includes determining a picture slice number of the received picture frame, and correspondingly, the channel feedback information further indicates the picture slice number.

A frame of picture is divided into a plurality of picture slices for encoding and sending. When the current picture is the picture slice, the decoder side may determine a received picture slice number while determining a received frame number and layer number, and then adds the frame number of the received picture slice, the picture slice number, and the layer number corresponding to the picture slice number to the channel feedback information. The foregoing processing process based on a picture may be processed in a same way as that based on a picture slice.

According to a third aspect, this disclosure provides a picture encoding apparatus, including an inter prediction module configured to determine a reference frame number of a current picture based on channel feedback information, where the channel feedback information indicates information about a picture frame received by a decoder side, obtain a first reference layer number set of a first picture frame corresponding to the reference frame number, where the first reference layer number set includes layer numbers of N1 layers, 1≤N1<L1, and L1 indicates a total quantity of layers of the first picture frame, and determine a reference layer number of the current picture based on the channel feedback information and the first reference layer number set, and an encoding module configured to perform video encoding on the current picture based on the reference frame number and the reference layer number to obtain a bitstream.

In a possible implementation, the encoding module is further configured to obtain, from a DPB, a reconstructed picture corresponding to the reference frame number and the reference layer number, where the DPB stores only reconstructed pictures of the N1 layers for the first picture frame, and use the obtained reconstructed picture corresponding to the reference frame number and the reference layer number as a reference picture, and perform video encoding on the current picture based on the reference picture to obtain the bitstream.

In a possible implementation, when there is only one decoder side, the inter prediction module is further configured to obtain a plurality of pieces of channel feedback information, where the channel feedback information indicates a frame number of a picture frame received by the decoder side, and determine, as the reference frame number of the current picture, a frame number that is in a plurality of frame numbers indicated by the plurality of pieces of channel feedback information and that is closest to a frame number of the current picture.

In a possible implementation, the inter prediction module is further configured to determine, as a target layer number, a highest layer number indicated by channel feedback information indicating the reference frame number, and when the first reference layer number set includes the target layer number, determine the target layer number as the reference layer number of the current picture, or when the first reference layer number set does not include the target layer number, determine, as the reference layer number of the current picture, a layer number that is in the first reference layer number set and that is less than and closest to the target layer number.

In a possible implementation, when there are a plurality of decoder sides, the inter prediction module is further configured to obtain a plurality of groups of channel feedback information, where the plurality of groups of channel feedback information correspond to the plurality of decoder sides, each group of channel feedback information includes a plurality of pieces of channel feedback information, and the channel feedback information indicates a frame number of a picture frame received by a corresponding decoder side, determine one or more common frame numbers based on the plurality of groups of channel feedback information, where the common frame number is a frame number indicated by at least one piece of channel feedback information in each group of channel feedback information, and determine the reference frame number of the current picture based on the one or more common frame numbers.

In a possible implementation, the inter prediction module is further configured to obtain a highest layer number indicated by channel feedback information that is in each of the plurality of groups of channel feedback information and that indicates the reference frame number, determine a smallest highest layer number among the plurality of highest layer numbers as a target layer number, and determine the reference layer number of the current picture based on the target layer number and the first reference layer number set.

In a possible implementation, the channel feedback information comes from a corresponding decoder side and/or a network device on a transmission link.

In a possible implementation, the channel feedback information is generated based on a sent bitstream.

In a possible implementation, the inter prediction module is further configured to obtain a plurality of pieces of channel feedback information, where the channel feedback information indicates the frame number of the picture frame received by the decoder side, determine, as a target frame number, a frame number that is in a plurality of frame numbers indicated by the plurality of pieces of channel feedback information and that is closest to a frame number of the current picture, and when a highest layer number indicated by channel feedback information indicating the target frame number is greater than or equal to a highest layer number in a second reference layer number set, determine the target frame number as the reference frame number, where the second reference layer number set is a reference layer number set of a second picture frame corresponding to the target frame number.

In a possible implementation, the inter prediction module is further configured to, when the highest layer number indicated by the channel feedback information indicating the target frame number is less than the highest layer number in the second reference layer number set, determine, as the reference frame number of the current picture, a specified frame number in the plurality of frame numbers indicated by the plurality of pieces of channel feedback information.

In a possible implementation, the inter prediction module is further configured to, when the first reference layer number set does not include the target layer number, if the first reference layer number set does not include a layer number less than the target layer number, determine a reference frame number of a previous frame of the current picture as the reference frame number of the current picture, and determine a reference layer number of the previous frame as the reference layer number of the current picture.

In a possible implementation, the bitstream further includes the first reference layer number set.

In a possible implementation, the bitstream further includes the reference frame number.

In a possible implementation, the bitstream further includes the reference frame number and the reference layer number.

In a possible implementation, when the current picture is a picture slice, the inter prediction module is further configured to determine that a picture slice number of the current picture is the same as a picture slice number of the picture frame received by the decoder side, and determine a layer number corresponding to the picture slice number of the picture frame received by the decoder side as the target layer number, and when the first reference layer number set includes the target layer number, determine the target layer number as the reference layer number of the current picture, or when the first reference layer number set does not include the target layer number, determine, as the reference layer number of the current picture, a layer number that is in the first reference layer number set and that is less than and closest to the target layer number.

According to a fourth aspect, this disclosure provides a picture decoding apparatus, including an obtaining module configured to obtain a bitstream, an inter prediction module configured to parse the bitstream to obtain a reference frame number of a current picture, obtain a third reference layer number set of a third picture frame corresponding to the reference frame number, where the third reference layer number set includes layer numbers of N2 layers, $1 \leq N2 < L2$, and L2 indicates a total quantity of layers of the third picture frame, and determine a reference layer number of the current picture based on the third reference layer number set, and a decoding module configured to perform video decoding based on the reference frame number and the reference layer number to obtain a reconstructed picture of the current picture.

In a possible implementation, the decoding module is further configured to obtain, from a DPB, a reconstructed picture corresponding to the reference frame number and the reference layer number, and use the obtained reconstructed picture corresponding to the reference frame number and the reference layer number as a reference picture, and perform video decoding based on the reference picture to obtain the reconstructed picture of the current picture.

In a possible implementation, the decoding module is further configured to store reconstructed pictures of N3 layers of the current picture in the DPB, where a fourth reference layer number set of the current picture includes layer numbers of M layers, the M layers include the N3 layers, $1 \leq M < L3$, and L3 indicates a total quantity of layers of the current picture, or store a reconstructed picture of a highest layer among N3 layers in the DPB.

In a possible implementation, the apparatus further includes a display module configured to display a reconstructed picture of an $L4^{th}$ layer of the current picture, where L4 indicates a layer number of a highest layer obtained by decoding the current picture.

In a possible implementation, the inter prediction module is further configured to determine a highest layer number among layer numbers respectively corresponding to a plurality of reconstructed pictures that are obtained through decoding and that are of the third picture frame, and when the third reference layer number set includes the highest layer number, determine the highest layer number as the reference layer number of the current picture, or when the reference layer number set does not include the highest layer number, determine, as the reference layer number of the current picture, a layer number that is in the third reference layer number set and that is less than and closest to the highest layer number.

In a possible implementation, the inter prediction module is further configured to, when the third reference layer number set does not include the highest layer number, if the third reference layer number set does not include a layer number less than the highest layer number, determine a reference frame number of a previous frame of the current picture as the reference frame number of the current picture, and determine a reference layer number of the previous frame as the reference layer number of the current picture.

In a possible implementation, the apparatus further includes a sending module configured to determine a frame number and a layer number of a received picture frame, and send channel feedback information to an encoder side, where the channel feedback information indicates the frame number and the layer number of the received picture frame.

In a possible implementation, the sending module is further configured to, when it is determined, based on a frame number in the bitstream, that a second frame starts to be parsed, send the channel feedback information to the encoder side, where the channel feedback information indicates a frame number of a first frame and a layer number of a highest layer of the received first frame, and the first frame is a previous frame of the second frame, or when it is determined, based on the layer number of the received picture frame, that a first frame is completely received, send the channel feedback information to the encoder side, where the channel feedback information indicates a frame number of the first frame and a layer number of a highest layer of the received first frame.

In a possible implementation, when the current picture is a picture slice, the sending module is further configured to determine a picture slice number of the received picture frame, and correspondingly, the channel feedback information further indicates the picture slice number.

According to a fifth aspect, this disclosure provides an encoder, including one or more processors, and a non-transitory computer-readable storage medium coupled to the processor and storing a program executed by the processor. When the program is executed by the processor, the encoder is enabled to perform the method according to the first aspect or any one of the possible implementations of the first aspect.

According to a sixth aspect, this disclosure provides a decoder, including one or more processors, and a non-transitory computer-readable storage medium coupled to the processor and storing a program executed by the processor, where when the program is executed by the processor, the decoder is enabled to perform the method according to the second aspect or any one of the possible implementations of the second aspect.

According to a seventh aspect, this disclosure provides a non-transitory computer-readable storage medium, including program code. The program code is executed by a computer device, to perform the method according to the first or second aspect, or any one of the possible implementations of the first or second aspect.

According to an eighth aspect, this disclosure provides a non-transitory storage medium, including a bitstream encoded according to the method according to the first or second aspect, or any one of the possible implementations of the first or second aspect.

According to a ninth aspect, this disclosure provides a computer program product including instructions. When the computer program product runs on a computer, the computer performs the method according to the first or second aspect, or any one of the possible implementations of the first or second aspect.

BRIEF DESCRIPTION OF DRAWINGS

FIG. 7 is an example flowchart of a picture encoding method according to this disclosure;

FIG. 8 is an example flowchart of a picture decoding method according to this disclosure;

DESCRIPTION OF EMBODIMENTS

Figure 1A:
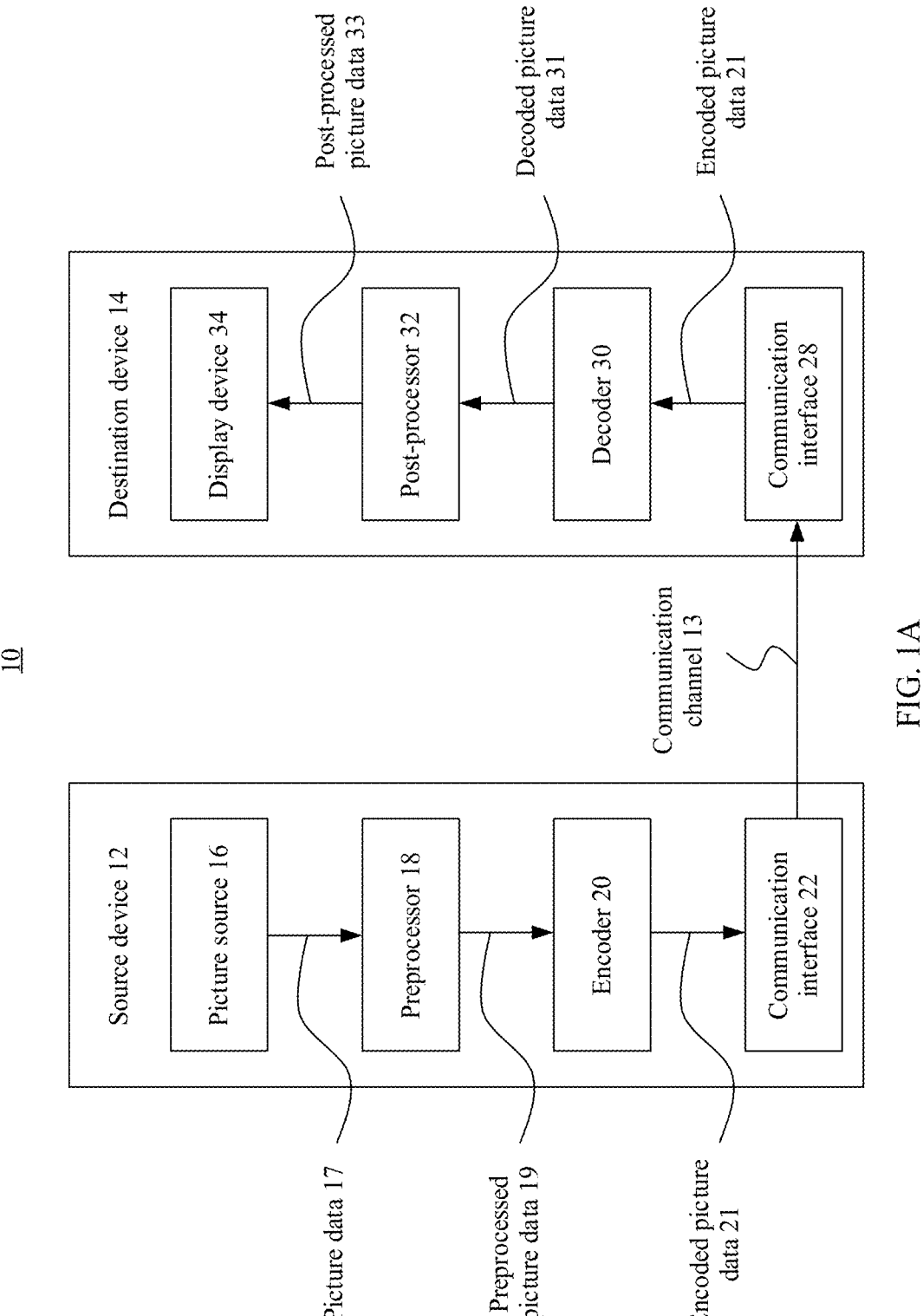
FIG. 1A is an example block diagram of a coding system according to an embodiment of this disclosure.

To make the objectives, technical solutions, and advantages of this disclosure clearer, the following clearly describes the technical solutions of this disclosure with reference to the accompanying drawings in this disclosure. It is clear that the described embodiments are merely a part rather than all of embodiments of this disclosure. All other embodiments obtained by a person of ordinary skill in the art based on embodiments of this disclosure without creative efforts shall fall within the protection scope of this disclosure.

In this specification, embodiments, claims, and accompanying drawings of this disclosure, terms such as "first" and "second" are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that, in this disclosure, "at least one" refers to one or more, and "a plurality of" refers to two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

Video coding typically refers to processing of a sequence of pictures, where the sequence of pictures forms a video or a video sequence. In the field of video coding, the terms "picture", "frame", and "image" may be used as synonyms. Video coding (or coding in general) includes two parts: video encoding and video decoding. Video encoding is performed at a source side, and typically includes processing (for example, compressing) an original video picture to reduce an amount of data required for representing the video picture (for more efficient storage and/or transmission). Video decoding is performed at a destination side, and typically includes inverse processing in comparison with processing of an encoder to reconstruct the video picture.

"Coding" of a video picture (or picture in general) in embodiments shall be understood as "encoding" or "decoding" of a video picture or a video sequence. A combination of an encoding part and a decoding part is also referred to as CODEC (encoding and decoding).

In a case of lossless video coding, the original video picture can be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing the video picture, and the video picture cannot be completely reconstructed on a decoder side. In other words, quality of a reconstructed video picture is lower or poorer than that of the original video picture.

Several video coding standards are used for "lossy hybrid video coding" (that is, spatial and temporal prediction in a sample domain is combined with two-dimensional (2D) transform coding for applying quantization in a transform domain). Each picture of a video sequence is typically partitioned into a set of non-overlapping blocks, and coding is typically performed at a block level. To be specific, at an encoder side, a video is usually processed, that is, encoded, at a block (video block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At the decoder side, an inverse processing part relative to the encoder is applied to an encoded block or a compressed block to reconstruct the current block for representation. Furthermore, the encoder needs to repeat processing steps of a decoder, so that the encoder and the decoder generate same prediction (for example, intra prediction and inter prediction) and/or reconstruct pixels for processing, namely, encoding a subsequent block.

In the following embodiment of a coding system 10, an encoder 20 and a decoder 30 are described with reference to FIG. 1A to FIG. 3.

FIG. 1A is an example block diagram of the coding system 10 according to an embodiment of this disclosure, for example, a video coding system 10 (or the coding system 10) that can use a technology in this disclosure. A video encoder 20 (or the encoder 20) and a video decoder 30 (or the decoder 30) of the video coding system 10 represent devices that may be configured to perform techniques in accordance with various examples described in this disclosure.

As shown in FIG. 1A, the coding system 10 includes a source device 12 for providing encoded picture data 21 such as an encoded picture to a destination device 14 for decoding the encoded picture data 21.

The source device 12 includes the encoder 20, and may additionally, that is, optionally, include a picture source 16, a preprocessor (or preprocessing unit) 18, for example, a picture preprocessor, and a communication interface (or communication unit) 22.

The picture source 16 may include or be any type of picture capturing device for capturing a real-world picture, and/or any type of picture generation device, for example, a computer graphics processing unit for generating a computer animated picture or any type of device for obtaining and/or providing the real-world picture, a computer generated picture (for example, screen content, a virtual reality (VR)

picture, and/or any combination thereof (for example, an augmented reality (AR) picture)). The picture source may be any type of memory or storage that stores any of the foregoing pictures.

In order to distinguish processing performed by the preprocessor (or preprocessing unit) 18, a picture (or picture data) 17 may also be referred to as an original picture (or original picture data) 17.

The preprocessor 18 is configured to receive the original picture data 17, and preprocess the original picture data 17, to obtain a preprocessed picture (or preprocessed picture data) 19. Preprocessing performed by the preprocessor 18 may, for example, include trimming, color format conversion (for example, from red, green, and blue (RGB) to luma, chroma blue projection, and chroma red projection (YCbCr)), color correction, or de-noising. It may be understood that the preprocessing unit 18 may be an optional component.

The video encoder (or encoder) 20 is configured to receive the preprocessed picture data 19 and provide the encoded picture data 21 (further details are described below, for example, based on FIG. 2).

The communication interface 22 of the source device 12 may be configured to receive the encoded picture data 21 and to transmit the encoded picture data 21 (or any further processed version thereof) over a communication channel 13 to another device, for example, the destination device 14 or any other device, for storage or direct reconstruction.

The destination device 14 includes the decoder 30, and may additionally, that is, optionally, include a communication interface (or communication unit) 28, a post-processor (or post-processing unit) 32, and a display device 34.

The communication interface 28 of the destination device 14 is configured to receive the encoded picture data 21 (or any further processed version thereof), for example, directly from the source device 12 or from any other source device, for example, a storage device, for example, an encoded picture data storage device, and provide the encoded picture data 21 to the decoder 30.

The communication interface 22 and the communication interface 28 may be configured to transmit or receive the encoded picture data (encoded data) 21 via a direct communication link between the source device 12 and the destination device 14, for example, a direct wired or wireless connection, or via any kind of network, for example, a wired or wireless network or any combination thereof, or any kind of private and public network or any kind of combination thereof.

The communication interface 22 may be, for example configured to package the encoded picture data 21 into an appropriate format, for example, a packet, and/or process the encoded picture data using any kind of transmission encoding or processing for transmission over a communication link or communication network.

The communication interface 28, forming the counterpart of the communication interface 22, may be, for example configured to receive the transmitted data and process the transmitted data using any kind of corresponding transmission decoding or processing and/or de-packaging to obtain the encoded picture data 21.

Both the communication interface 22 and the communication interface 28 may be configured as unidirectional communication interfaces as indicated by the arrow for the communication channel 13 in FIG. 1A pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or decoded picture data) 31 (further details will be described below, for example, based on FIG. 3).

The post-processor 32 is configured to post-process the decoded picture data 31 (also referred to as reconstructed picture data), for example, a decoded picture, to obtain post-processed picture data 33, for example, a post-processed picture. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by the display device 34.

The display device 34 is configured to receive the post-processed picture data 33 for displaying the picture, for example, to a user or viewer. The display device 34 may be or include any type of display for representing the reconstructed picture, for example, an integrated or external display screen or display. For example, the display screen may include a liquid-crystal display (LCD), an organic light-emitting diode (LED) (OLED) display, a plasma display, a projector, a micro LED display, a liquid crystal on silicon (LCoS), a digital light processor (DLP), or any type of other display screen.

Although FIG. 1A shows the source device 12 and the destination device 14 as separate devices, embodiments of devices may also include both or both functionalities, the source device 12 or corresponding functionality and the destination device 14 or corresponding functionality. In such embodiments, the source device 12 or corresponding functionality and the destination device 14 or corresponding functionality may be implemented using the same hardware and/or software or by separate hardware and/or software or any combination thereof.

As will be apparent for a skilled person based on the description, existence and (exact) division into different units or functionalities in the source device 12 and/or the destination device 14 shown in FIG. 1A may vary depending on an actual device and application.

Figure 1B:
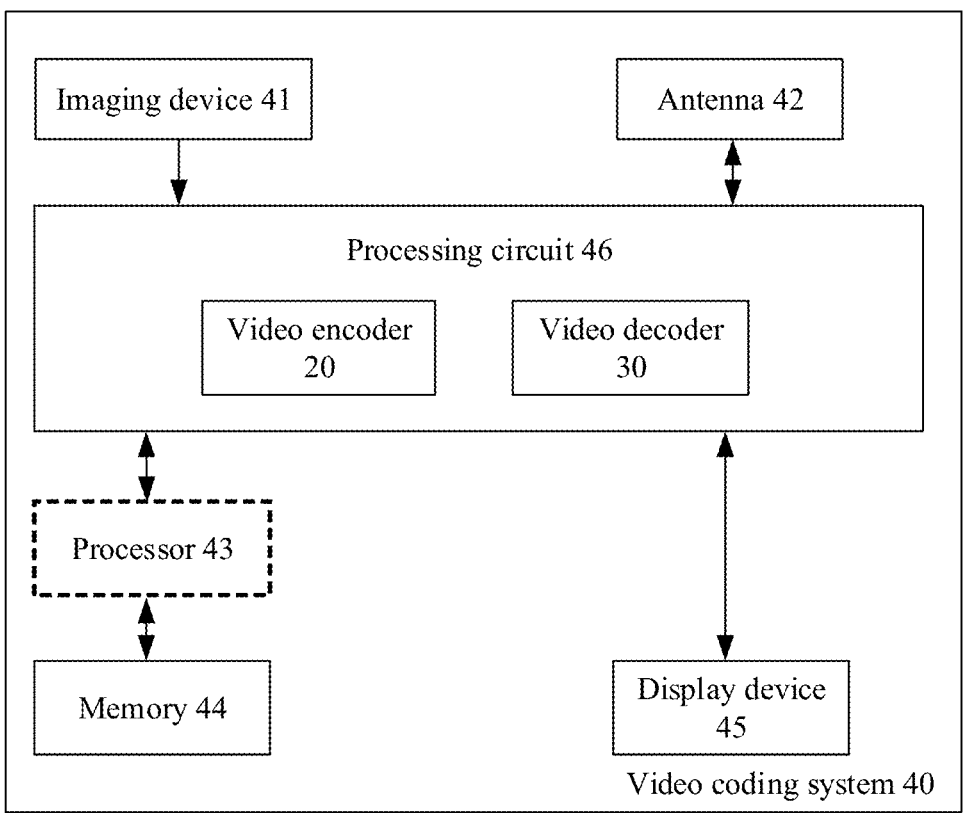
FIG. 1B is an example block diagram of a video coding system according to an embodiment of this disclosure.
Figure 5:
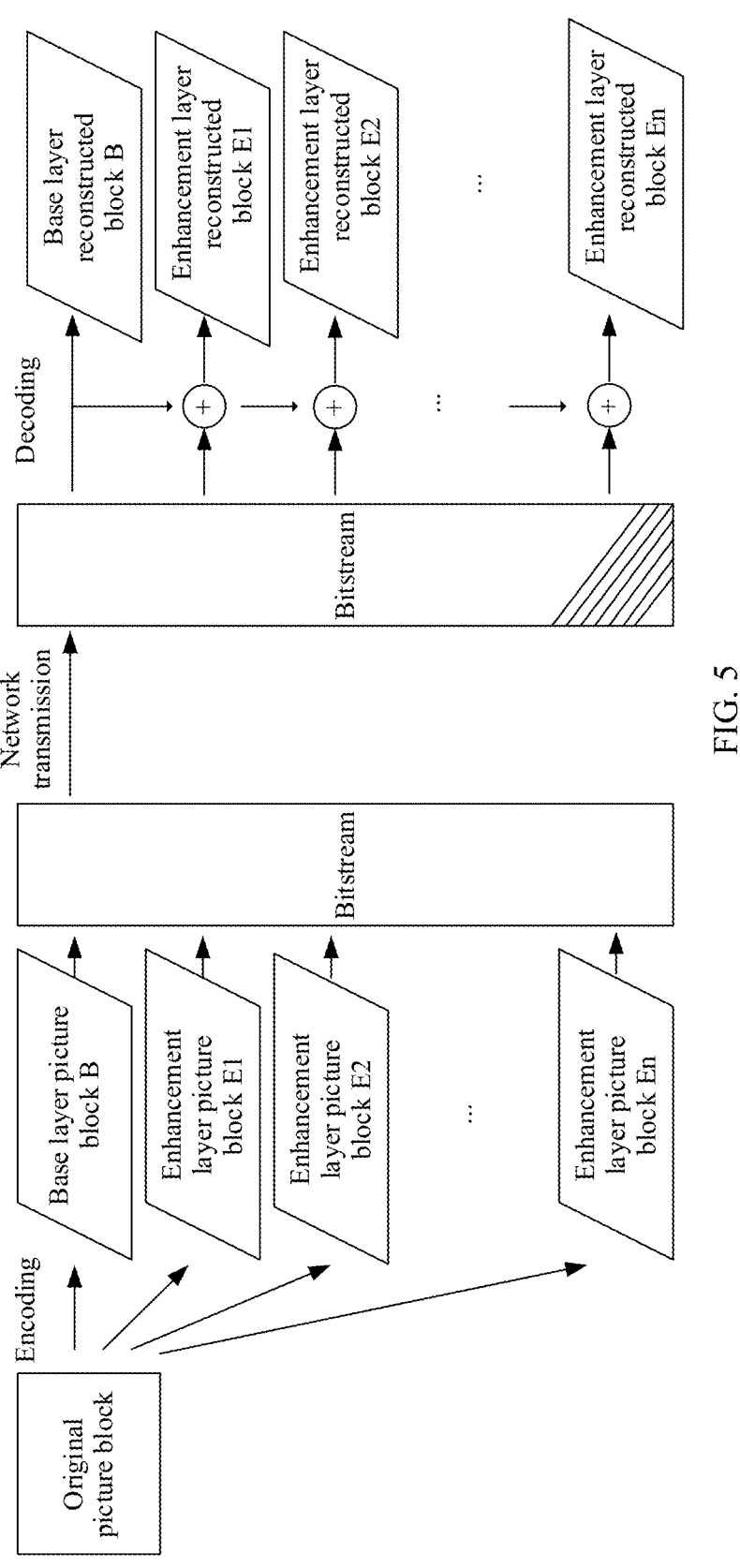
FIG. 5 is a schematic diagram of an example of a level of scalable video encoding according to this disclosure.

The encoder 20 (for example, the video encoder 20) or the decoder 30 (for example, the video decoder 30) or both the encoder 20 and the decoder 30 may be implemented by a processing circuit as shown in FIG. 1B, for example, one or more microprocessors, digital signal processors (DSPs), application-specific integrated circuits (ASICs), field-programmable gate arrays (FPGAs), discrete logic, hardware, dedicated processors for video coding, or any combination thereof. The encoder 20 may be implemented by a processing circuit 46 to embody the various modules as discussed with respect to the encoder 20 in FIG. 2 and/or any other encoder system or subsystem described in the specification. The decoder 30 may be implemented by the processing circuit 46 to embody the various modules as discussed with respect to the decoder 30 in FIG. 3 and/or any other decoder system or subsystem described in the specification. The processing circuit 46 may be configured to perform the various operations as discussed below. As shown in FIG. 5, if some techniques are implemented in software, a device may store instructions of the software in a suitable computer-readable storage medium, and execute the instructions in hardware by using one or more processors, to perform the techniques of the present disclosure. Either of the video encoder 20 and the video decoder 30 may be integrated as part of a combined encoder/decoder (CODEC) in a single device, for example, as shown in FIG. 1B.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content service servers or content delivery servers), broadcast receiver devices, broadcast transmitter devices, or the like, and may use no or any type of operating systems.

In some cases, the source device 12 and the destination device 14 may be equipped with components for wireless communication. Therefore, the source device 12 and the destination device 14 may be wireless communication devices.

In some cases, the video coding system 10 shown in FIG. 1A is merely an example. The techniques of this disclosure may apply to video coding settings (for example, video encoding or video decoding) that do not necessarily include any data communication between an encoding device and a decoding device. In other examples, data is retrieved from a local memory, sent over a network, or the like. A video encoding device may encode data and store encoded data into a memory, and/or a video decoding device may retrieve the data from the memory and decode the data. In some examples, encoding and decoding are performed by devices that do not communicate with each other, but simply encode data into a memory and/or retrieve data from the memory and decode the data.

FIG. 1B is an example block diagram of a video coding system 40 according to an embodiment of this disclosure. As shown in FIG. 1B, the video coding system 40 may include an imaging device 41, a video encoder 20, a video decoder 30 (and/or a video encoder/decoder implemented by the processing circuit 46), an antenna 42, one or more processors 43, one or more memories 44, and/or a display device 45.

As shown in FIG. 1B, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include ASIC logic, a graphics processing unit, a general-purpose processor, or the like. The video coding system 40 may also include an optional processor 43. Similarly, the optional processor 43 may include ASIC logic, a graphics processing unit, a general-purpose processor, or the like. In addition, the memory 44 may be a memory of any type, for example, a volatile memory (for example, a static random-access memory (SRAM) or a dynamic random-access memory (DRAM)) or a non-volatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by a logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may be included in the video encoder 20 implemented by the processing circuit 46, to embody various modules discussed with reference to FIG. 2 and/or any other encoder system or subsystem described in the specification. The logic circuit may be configured to perform various operations described in this specification.

In some examples, the video decoder 30 may be implemented by the processing circuit 46 in a similar manner, to embody various modules discussed with reference to the video decoder 30 in FIG. 3 and/or any other decoder system or subsystem described in the specification. In some examples, the video decoder 30 implemented by the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may be included in the video decoder 30 implemented by the processing circuit 46, to embody various modules discussed with reference to FIG. 3 and/or any other decoder system or subsystem described in the specification.

In some examples, the antenna 42 may be configured to receive an encoded bitstream of video data. As described, the encoded bitstream may include data, an indicator, an index value, mode selection data, or the like related to video frame encoding described in this specification, for example, data related to encoding partitioning (for example, a transform coefficient or a quantized transform coefficient, an optional indicator (as described), and/or data defining the encoding partitioning). The video coding system 40 may further include the video decoder 30 that is coupled to the antenna 42 and that is configured to decode the encoded bitstream. The display device 45 is configured to present a video frame.

It should be understood that, in this embodiment of this disclosure, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy encode the syntax element into an encoded video bitstream. In such examples, the video decoder 30 may parse such syntax element and correspondingly decode related video data.

Figure 2:
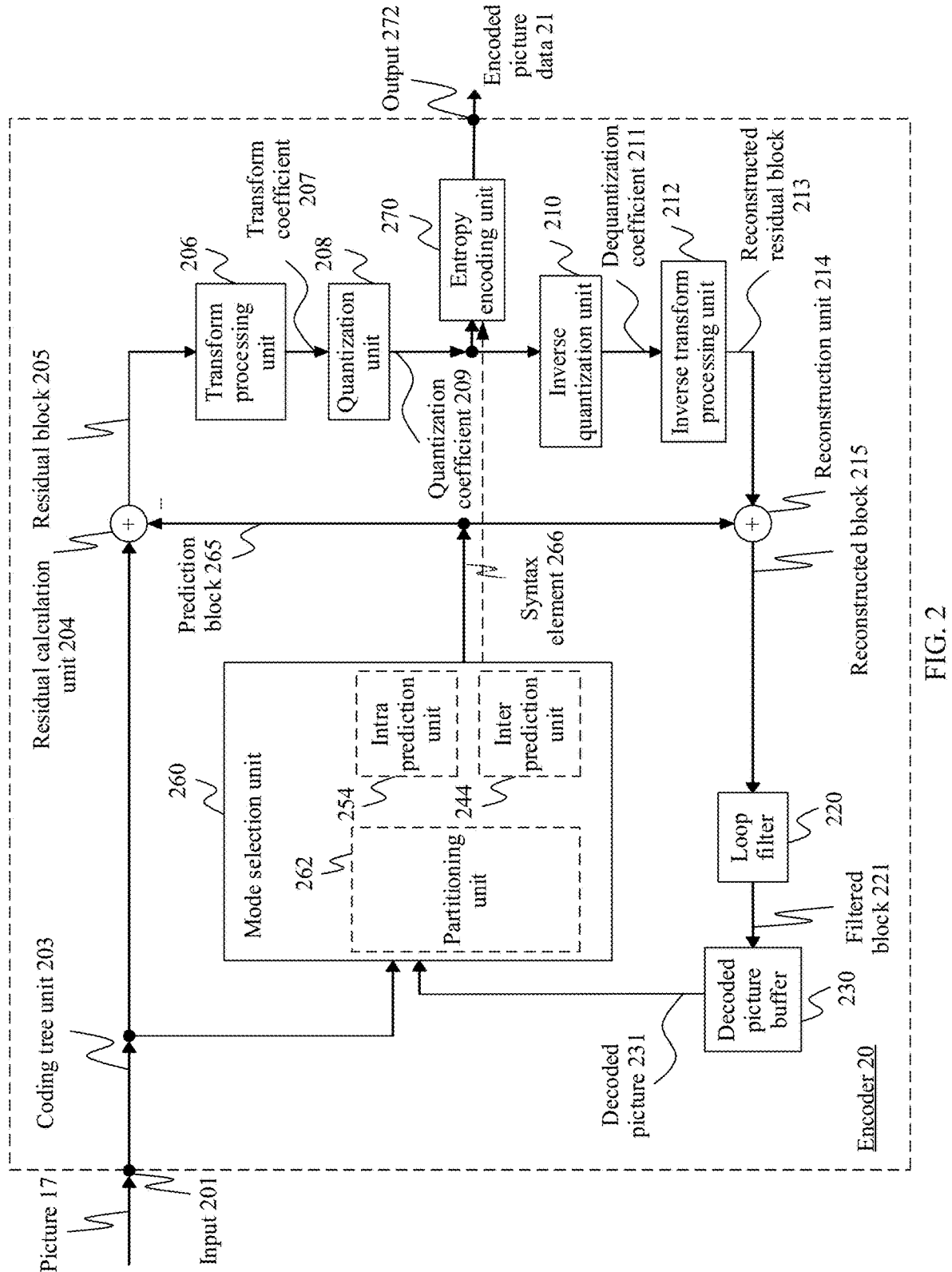
FIG. 2 is an example block diagram of a video encoder according to an embodiment of this disclosure.

For ease of description, embodiments of the present disclosure are described by referring to Versatile Video Coding (VVC) reference software or High Efficiency Video Coding (HEVC) developed by the Joint Collaboration Team on Video Coding (JCT-VC) of the International Telecommunication Union (ITU) Telecommunication Standardization Sector (ITU-T) Video Coding Experts Group (v) and the International Organization for Standardization (ISO)/the International Electrotechnical Commission (IEC) Motion Picture Experts Group (MPEG). A person of ordinary skill in the art understands that embodiments of the present disclosure are not limited to the HEVC or the VVC.
Encoder and Encoding Method:

FIG. 2 is an example block diagram of the video encoder 20 according to an embodiment of this disclosure. As shown in FIG. 2, the video encoder 20 includes an input (or input interface) 201, a residual calculation unit 204, a transform processing unit 206, a quantization unit 208, an inverse quantization unit 210, an inverse transform processing unit 212, a reconstruction unit 214, a loop filter 220, a DPB 230, a mode selection unit 260, an entropy encoding unit 270, and an output (or output interface) 272. The mode selection unit 260 may include an inter prediction unit 244, an intra prediction unit 254 and a partitioning unit 262. The inter prediction unit 244 may include a motion estimation unit and a motion compensation unit. The video encoder 20 shown in FIG. 2 may also be referred to as a hybrid video encoder or a video encoder based on a hybrid video codec.

Figure 3:
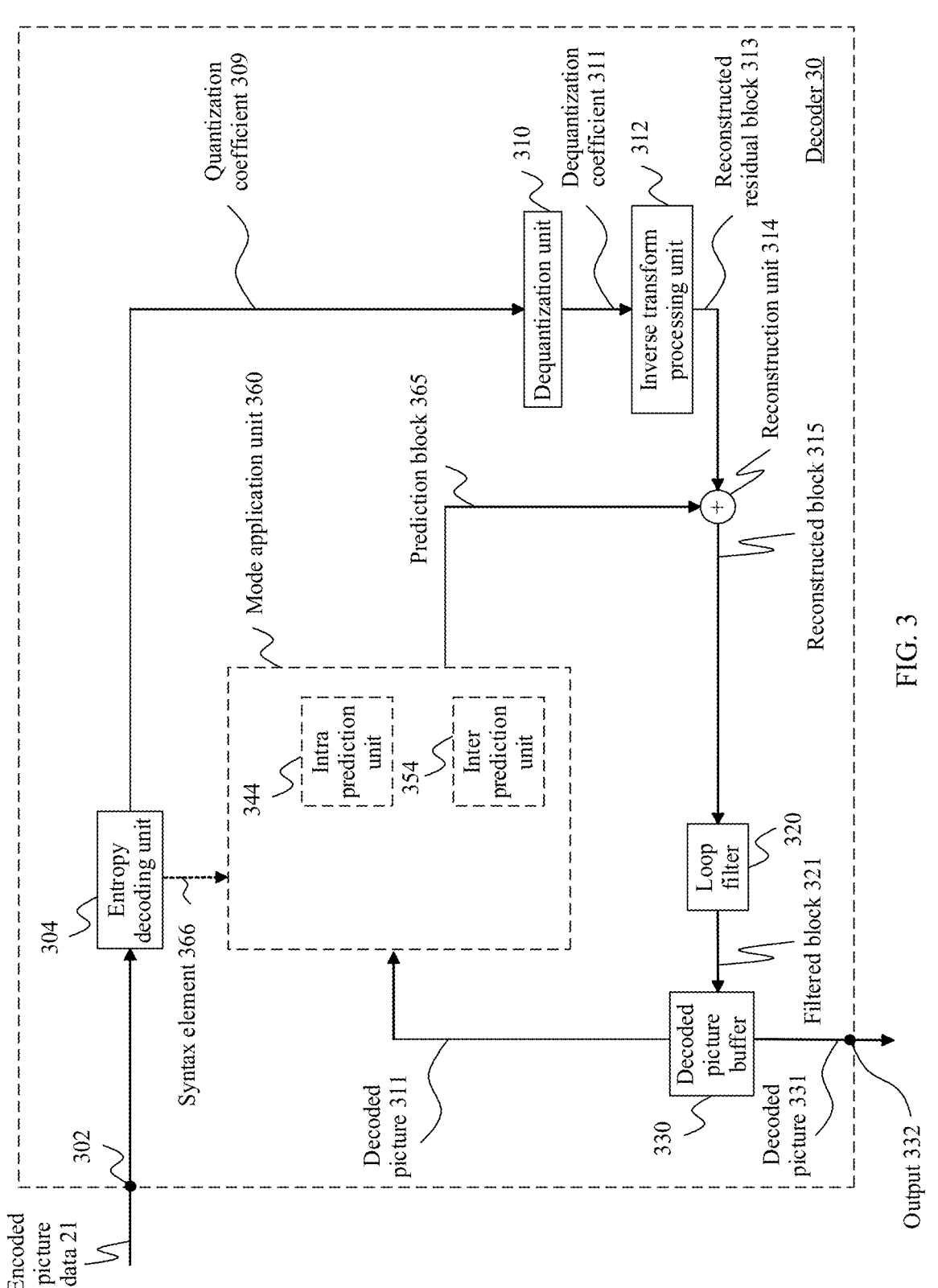
FIG. 3 is an example block diagram of a video decoder according to an embodiment of this disclosure.

The residual calculation unit 204, the transform processing unit 206, the quantization unit 208, and the mode selection unit 260 are referred to as forming a forward signal path of the encoder 20, whereas the inverse quantization unit 210, the inverse transform processing unit 212, the reconstruction unit 214, a buffer 216, the loop filter 220, the DPB 230, the inter prediction unit 244, and the intra prediction unit 254 are referred to as forming a backward signal path of the encoder, where the backward signal path of the encoder 20 corresponds to a signal path of a decoder (refer to the decoder 30 in FIG. 3). The inverse quantization unit 210, the inverse transform processing unit 212, the reconstruction unit 214, the loop filter 220, the DPB 230, the inter prediction unit 244, and the intra prediction unit 254 are further referred to as forming a "built-in decoder" of the video encoder 20.
Pictures and Picture Partitioning (Pictures and Blocks):

The encoder 20 may be configured to receive, for example, via the input 201, a picture (or picture data) 17, for example, a picture in a sequence of pictures forming a video or video sequence. The received picture or picture data may also be a preprocessed picture (or preprocessed picture data) 19. For ease of simplicity, the following description refers to the picture 17. The picture 17 may also be referred to as a current picture or to-be-encoded picture (in particular in video coding to distinguish the current picture from other pictures, for example, previously encoded and/or decoded pictures of a same video sequence, namely, a video sequence which also includes the current picture).

A (digital) picture is or may be considered as a two-dimensional array or matrix of samples with intensity values. A sample in the array may also be referred to as a pixel (or pel) (short form of a picture element). A quantity of samples in horizontal and vertical direction (or axis) of the array or picture defines a size and/or resolution of the picture. For representation of color, three color components are usually used, to be specific, the picture may be represented as or include three sample arrays. In an RBG format or color space, a picture includes corresponding sample arrays of red, green, and blue. However, in video coding, each pixel is typically represented in a luminance and chrominance format or color space, for example, YCbCr, which includes a luminance component indicated by Y (sometimes also L is used instead) and two chrominance components indicated by Cb and Cr. The luminance (luma) component Y indicates luminance or gray level intensity (for example, like in a gray-scale picture), while the two chrominance (chrominance, chroma) components Cb and Cr indicate chrominance or color information components. Accordingly, a picture in a YCbCr format includes a luminance sample array of luminance sample values (Y), and two chrominance sample arrays of chrominance values (Cb and Cr). An RGB format of a picture may be converted or transformed into the YCbCr format and vice versa, the process is also referred to as color transformation or conversion. If a picture is monochrome, the picture may include only a luminance sample array. Accordingly, a picture may be, for example, an array of luminance samples in a monochrome format or an array of luminance samples and two corresponding arrays of chrominance samples in 4:2:0, 4:2:2, and 4:4:4 color formats.

In an embodiment, embodiments of the video encoder 20 may include a picture partitioning unit (not shown in FIG. 2) configured to partition the picture 17 into a plurality of (typically non-overlapping) picture blocks 203. These blocks may also be referred to as root blocks, macro blocks (H.264/Advanced Video Coding (AVC)), coding tree blocks (CTBs), or coding tree units (CTUs) (H.265/HEVC and VVC). The partitioning unit may be configured to use a same block size for all pictures of a video sequence and a corresponding grid defining the block size, or to change a block size between pictures or picture subsets or groups of pictures, and partition each picture into corresponding blocks.

In other embodiments, the video encoder may be configured to directly receive the block 203 of the picture 17, for example, one, several or all blocks forming the picture 17. The picture block 203 may also be referred to as a current picture block or to-be-encoded picture block.

Like the picture 17, the picture block 203 is also or may be considered as a two-dimensional array or matrix of samples with intensity values (sample values), although of a smaller dimension than the picture 17. In other words, the block 203 may include one sample array (for example, a luma array in case of a monochrome picture 17, or a luma or chroma array in case of a color picture), three sample arrays (for example, a luma array and two chroma arrays in case of a color picture 17), or any other quantity and/or type of arrays depending on a color format used. A quantity of samples in horizontal and vertical direction (or axis) of the block 203 defines a size of the block 203. Accordingly, a block may, for example, an M×N (M-column by N-row) array of samples, or an M×N array of transform coefficients.

In an embodiment, the video encoder 20 shown in FIG. 2 may be configured to encode the picture 17 block by block, for example, encoding and prediction are performed per block 203.

In an embodiment, the video encoder 20 shown in FIG. 2 may be further configured to partition and/or encode the picture by using slices (also referred to as video slices), where a picture may be partitioned into or encoded using one or more slices (typically non-overlapping). Each slice may include one or more blocks (for example, coding tree units CTUs) or one or more groups of blocks (for example, tiles in the H.265/HEVC/VVC standard and bricks in the VVC standard).

In an embodiment, the video encoder 20 shown in FIG. 2 may be further configured to partition and/or encode the picture by using slices/tile groups (also referred to as video tile groups) and/or tiles (also referred to as video tiles). A picture may be partitioned into or encoded using one or more slices/tile groups (typically non-overlapping), and each slice/tile group may include, for example, one or more blocks (for example, CTUs) or one or more tiles. Each tile, for example, may be of rectangular shape and may include one or more blocks (for example, CTUs), for example, complete or fractional blocks.

Residual Calculation:

The residual calculation unit 204 may be configured to calculate a residual block 205 based on the picture block 203 and a prediction block 265 (further details about the prediction block 265 are provided later), for example, by subtracting sample values of the prediction block 265 from sample values of the picture block 203, sample by sample (pixel by pixel) to obtain the residual block 205 in a sample domain.

Transform:

The transform processing unit 206 is configured to apply a transform, for example, a discrete cosine transform (DCT) or discrete sine transform (DST), on the sample values of the residual block 205 to obtain a transform coefficient 207 in a transform domain. The transform coefficient 207 may also be referred to as a transform residual coefficient and represent the residual block 205 in the transform domain.

The transform processing unit 206 may be configured to apply integer approximations of DCT/DST, such as transforms specified in the HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of a transform coefficient, and a tradeoff between accuracy and implementation costs. A specific scale factor is, for example, specified for an inverse transform, for example, by the inverse transform processing unit 212 on the encoder 20 side (and the corresponding inverse transform, for example, by the inverse transform processing unit 312 on the decoder 30 side), and a corresponding scale factor for the forward transform, for example, by the transform processing unit 206 on the encoder 20 side may be specified accordingly.

In an embodiment, the video encoder 20 (respectively the transform processing unit 206) may be configured to output transform parameters, for example, a type of transform or transforms, for example, directly or encoded or compressed via the entropy encoding unit 270, so that, for example, the video decoder 30 may receive and use the transform parameters for decoding.

Quantization:

The quantization unit 208 is configured to quantize the transform coefficient 207 to obtain a quantized transform coefficient 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a QP. For example, the QP may be an index to a predefined set of appropriate quantization steps. For example, a smaller QP may correspond to finer quantization (a smaller quantization step) and a larger QP may correspond to coarser quantization (a larger quantization step), or vice versa. The quantization may include division by a quantization step and a corresponding and/or the inverse dequantization, for example, by the inverse quantization unit 210, may include multiplication by the quantization step. Embodiments according to some standards such as the HEVC, may be configured to use a QP to determine the quantization step. Generally, the quantization step may be calculated based on a QP by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the QP. In an example implementation, the scaling of the inverse transform and dequantization may be combined. Alternatively, customized quantization tables may be used and signaled from the encoder to the decoder, for example, in a bitstream. The quantization is a lossy operation, where a loss increases with an increase in the quantization step.

In an embodiment, the video encoder 20 (respectively the quantization unit 208) may be configured to output a QP, for example, directly or encoded via the entropy encoding unit 270, so that, for example, the video decoder 30 may receive and apply the QP for decoding.

Inverse Quantization:

The inverse quantization unit 210 is configured to apply the inverse quantization of the quantization unit 208 on a quantization coefficient to obtain a dequantization coefficient 211, for example, by applying an inverse scheme of the quantization scheme applied by the quantization unit 208 based on or using the same quantization step as the quantization unit 208. The dequantization coefficient 211 may also be referred to as a dequantization residual coefficient 211 and correspond to the transform coefficient 207. However, the dequantization residual coefficient 211 is typically not identical to the transform coefficient due to the loss by quantization.

Inverse Transform:

The inverse transform processing unit 212 is configured to apply the inverse transform of the transform applied by the transform processing unit 206, for example, an inverse DCT or inverse DST, to obtain a reconstructed residual block 213 (or corresponding dequantization coefficient 213) in the sample domain. The reconstructed residual block 213 may also be referred to as the transform block 213.

Reconstruction:

The reconstruction unit 214 (for example, an adder 214) is configured to add the transform block 213 (namely, the reconstructed residual block 213) to the prediction block 265 to obtain a reconstructed block 215 in the sample domain, for example, by adding sample values of the reconstructed residual block 213 and the sample values of the prediction block 265.

Filtering:

The loop filter unit 220 (or "loop filter" 220), is configured to filter the reconstructed block 215 to obtain a filtered block 221, or in general, to filter reconstructed samples to obtain filtered sample values. The loop filter unit is, for example configured to smooth pixel transitions, or otherwise improve video quality. The loop filter unit 220 may include one or more loop filters such as a de-blocking filter, a sample-adaptive offset (SAO) filter, or one or more other filters, for example, an adaptive loop filter (ALF), a noise suppression filter (NSF), or any combination thereof. In an example, the loop filter unit 220 may include the de-blocking filter, the SAO filter, and the ALF filter. An order of a filtering process may be the de-blocking filter, the SAO filter, and the ALF filter. In another example, a process referred to as luma mapping with chroma scaling (LMCS) (namely, an adaptive in-loop reshaper) is added. This process is performed before de-blocking. In another example, a de-blocking filter process may be also applied to internal sub-block edges, for example, affine sub-blocks edges, advanced temporal motion vector predictor (ATMVP) sub-blocks edges, sub-block transform (SBT) edges, and intra sub-partition (ISP) edges. Although the loop filter unit 220 is shown in FIG. 2 as being a loop filter, in other configurations, the loop filter unit 220 may be implemented as a post loop filter. The filtered block 221 may also be referred to as a filtered reconstructed block 221.

In an embodiment, the video encoder 20 (respectively the loop filter unit 220) may be configured to output loop filter parameters (such as SAO filter parameters, ALF filter parameters, or LMCS parameters), for example, directly or encoded via the entropy encoding unit 270, so that, for example, the decoder 30 may receive and apply the same or different loop filter parameters for decoding.

DPB:

The DPB 230 may be a memory that stores reference pictures, or in general reference picture data, for encoding video data by the video encoder 20. The DPB 230 may be formed by any of a variety of memory devices, such as a DRAM, including a synchronous DRAM (SDRAM), a magnetoresistive random-access memory (RAM) (MRAM), a resistive RAM (RRAM), or other types of memory devices. The DPB 230 may be configured to store one or more filtered blocks 221. The DPB 230 may be further configured to store other previously filtered blocks, for example, previously reconstructed and filtered blocks 221, of the same current picture or of different pictures, for example, previously reconstructed blocks, and may provide complete previously reconstructed, for example, decoded, pictures (and corresponding reference blocks and samples) and/or a partially reconstructed current picture (and corresponding reference blocks and samples), for example for inter prediction. The DPB 230 may be further configured to store one or more unfiltered reconstructed blocks 215, or in general unfiltered reconstructed samples, for example, a reconstructed block 215 not filtered by the loop filter unit 220, or a reconstructed block or sample without any other processing.

Mode Selection (Partitioning and Prediction):

The mode selection unit 260 includes the partitioning unit 262, the inter prediction unit 244, and the intra prediction unit 254, and is configured to receive or obtain original picture data, for example, the original block 203 (the current block 203 of the current picture 17), and reconstructed picture data, for example, filtered and/or unfiltered reconstructed samples or blocks of the same (current) picture and/or from one or a plurality of previously decoded pictures, for example, from the DPB 230 or other buffers (for example, a line buffer, not shown in the figure). The reconstructed block data is used as reference picture data for prediction, for example, inter prediction or intra prediction, to obtain the prediction block 265 or predictor 265.

The mode selection unit 260 may be configured to determine or select a partitioning for a current block (including non-partitioning) and a prediction mode (for example, an intra or inter prediction mode) and generate a corresponding prediction block 265, which is used for calculation of the residual block 205 and for the reconstruction of the reconstructed block 215.

In an embodiment, the mode selection unit 260 may be configured to select the partitioning and the prediction mode (for example, from those supported by or available for the mode selection unit 260), which provides best matching or a minimum residual (the minimum residual refers to better compression for transmission or storage), or a minimum signaling overhead (the minimum signaling overhead refers to better compression for transmission or storage), or which considers or balances both. The mode selection unit 260 may be configured to determine the partitioning and the prediction mode based on rate distortion optimization (RDO), for example, select a prediction mode which provides a minimum rate distortion. The terms "best", "lowest", "optimal" and the like in the specification do not necessarily mean "best", "lowest", "optimal" in general, but may also refer to situations in which termination or selection criteria are met. For example, values that exceed or fall below a threshold or other restrictions may result in "suboptimal selections" but reduce complexity and processing time.

In other words, the partitioning unit 262 may be configured to partition a picture of a video sequence into a sequence of coding tree units (CTUs), and the CTU 203 may be further partitioned into smaller block partitions or sub-blocks (which form the blocks again), for example, iteratively using quad-tree partitioning (QT), binary-tree partitioning (BT) or triple-tree partitioning (TT) or any combination thereof, and to perform, for example, prediction for each of the block partitions or sub-blocks, where mode selection includes selection of a tree structure of the partitioned block 203 and prediction modes applied to each of the block partitions or sub-blocks.

The following describes in detail partitioning (for example, by the partitioning unit 262) and prediction (for example, by the inter prediction unit 244 and the intra prediction unit 254) that are performed by the video encoder 20.

Partitioning:

The partitioning unit 262 may partition (or split) a coding tree unit 203 into smaller partitions, for example, smaller blocks of square or rectangular size. For a picture that has three sample arrays, a CTU includes an N×N block of luma samples together with two corresponding blocks of chroma samples.

In the H.265/HEVC video coding standard, a frame of picture is partitioned into non-overlapping CTUs. A CTU size may be set to 64×64 (the CTU size may alternatively be set to another value, for example, in Joint Video Experts Team (JVET) reference software Joint Exploration Model (JEM), the CTU size is increased to 128×128 or 256×256.) A 64×64 CTU includes a rectangular sample array with 64 columns and 64 pixels per column, and each pixel includes a luma component or/and a chroma component.

In the H.265, a QT-based CTU splitting method is used, a CTU is used as a root node (root) of the QT, and the CTU is recursively split into several leaf nodes in a QT split manner. One node corresponds to one picture region. If a node is not split, the node is referred to as a leaf node, and a picture region corresponding to the node is a CU. If a node is further split, a picture region corresponding to the node may be split into four regions of a same size (a length and a width of each of the four regions are respectively half of a length and a width of the split region), and each region corresponds to one node. Whether these nodes are further split needs to be separately determined. Whether a node is to be split is indicated by a split flag split_cu_flag that is in a bitstream and that corresponds to the node. A node A is split into four nodes Bi once, where i=0 to 3, Bi is referred to as a child node of A, and A is referred to as a parent node of Bi. A QT depth (qtDepth) of a root node is 0, and the QT depth of the node is a value obtained by adding 1 to 4×QT depth of the parent node of the node.

In the H.265/HEVC standard, for a picture in a YUV4:2:0 format, a CTU includes one luma block and two chroma blocks. The luma block and the chroma block may be split in a same manner, and a coding tree is referred to as a luma-chrominance joint coding tree. In the VVC, if a current frame is an I frame, when a CTU is a node of a preset size (for example, 64×64) in an intra-coded frame (I frame), a luma block included in the node is split, by a luma coding tree, into a group of coding units that include only luma blocks, and a chroma block included in the node is split, by a chroma coding tree, into a group of coding units that include only chroma blocks. Luma coding tree splitting and chroma coding tree splitting are independent of each other. Coding trees independently used for the luma block and chroma block are referred to as separate trees. In the H.265, a CU includes a luminance pixel and a chrominance pixel. In standards such as the H.266 and the AVS3, in addition to a CU that includes both a luminance pixel and a chrominance pixel, there are also a luminance CU that includes only a luminance pixel and a chrominance CU that includes only a chrominance pixel.

As described above, the video encoder 20 is configured to determine or select a best or optimal prediction mode from a (pre-determined) prediction mode set. The prediction mode set may include, for example, an intra prediction mode and/or an inter prediction mode.

Intra Prediction:

An intra prediction mode set may include 35 different intra prediction modes, for example, non-directional modes such as a DC (or average) mode and a planar mode, or directional modes such as those defined in the HEVC, or may include 67 different intra prediction modes, for example, non-directional modes such as a DC (or average) mode and a planar mode, or directional modes such as those defined in the VVC. For example, several conventional angular intra prediction modes are adaptively replaced with wide-angle intra prediction modes for non-square blocks as defined in the VVC. For another example, to avoid division operations for DC prediction, only a longer side is used to compute an average for the non-square blocks. In addition, results of intra prediction of the planar mode may be further modified by using a position dependent intra prediction combination (PDPC) method.

The intra prediction unit 254 is configured to use reconstructed samples of neighboring blocks of a same current picture to generate an intra prediction block 265 based on an intra prediction mode in the intra prediction mode set.

The intra prediction unit 254 (or in general the mode selection unit 260) is further configured to output intra prediction parameters (or in general information indicative of the selected intra prediction mode for the block) to the entropy encoding unit 270 in form of syntax elements 266 for inclusion into the encoded picture data 21, so that, for example, the video decoder 30 may receive and use the prediction parameters for decoding.

Inter Prediction:

In a possible implementation, an inter prediction mode set depends on available reference pictures (that is, previous at least partially decoded pictures, for example, stored in the DPB 230) and other inter prediction parameters, for example, whether the entire reference picture or only a part, for example, a search window area around the area of the current block, of the reference picture is used for searching for a best matching reference block, and/or for example, whether pixel interpolation is applied, for example, half/semi-pel, quarter-pel and/or 1/16 pel interpolation, or not.

In addition to the foregoing prediction modes, a skip mode and/or a direct mode may further be applied.

For example, a merge candidate list of an extended merge prediction mode includes the following five types of candidates in order: spatial motion vector predictor (MVP) from spatial neighboring CUs, temporal MVP from collocated CUs, history-based MVP from an first in, first out (FIFO)

table, pairwise average MVP, and zero MVs. Bilateral matching-based decoder side motion vector refinement (DMVR) may be used to increase accuracy of the MVs of the merge mode. A merge mode with motion vector difference (MVD) (MMVD) comes from a merge mode with motion vector differences. An MMVD flag is sent right after a skip flag and a merge flag are sent, to specify whether the MMVD mode is used for a CU. A CU-level adaptive motion vector resolution (AMVR) scheme may be used. AMVR allows an MVD of the CU to be encoded in different precision. An MVD of a current CU may be adaptively selected based on a prediction mode of the current CU. When a CU is encoded in the merge mode, a combined inter/intra prediction (CIIP) mode may be applied to the current CU. Weighted averaging of inter and intra prediction signals is performed to obtain CIIP prediction. For affine motion compensation prediction, an affine motion field of a block is described by using motion information of two control point (4 parameters) or three control point motion vectors (6 parameters). Subblock-based temporal motion vector prediction (SbTMVP) is similar to temporal motion vector prediction (TMVP) in the HEVC, but predicts a motion vector of a sub-CU in a current CU. A bi-directional optical flow (BDOF), previously referred to as BIO, is a simpler version that needs much less computation, especially in terms of a quantity of multiplications and a value of a multiplier. In a triangle partition mode, a CU is split evenly into two triangular partitions through diagonal split and anti-diagonal split. In addition, a bi-prediction mode is extended beyond simple averaging to allow weighted averaging of two prediction signals.

The inter prediction unit 244 may include a motion estimation (ME) unit and a motion compensation (MC) unit (both are not shown in FIG. 2). The motion estimation unit may be configured to receive or obtain the picture block 203 (the current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded picture 231, or in other words, the current picture and the previously decoded picture 231 may be part of or form a sequence of pictures forming the video sequence.

The encoder 20 may, for example, be configured to select a reference block from a plurality of reference blocks of a same picture or different pictures of a plurality of other pictures and provide a reference picture (or a reference picture index) and/or an offset (spatial offset) between a position (x and y coordinates) of the reference block and a position of the current block as inter prediction parameters to the motion estimation unit. This offset is also referred to as a motion vector (MV).

The motion compensation unit is configured to obtain, for example, receive, an inter prediction parameter and perform inter prediction based on or using the inter prediction parameter to obtain an inter prediction block 246. Motion compensation performed by the motion compensation unit may include extracting or generating a prediction block based on a motion/block vector determined through motion estimation, and may further include performing interpolation on sub-pixel precision. Interpolation filtering may generate additional pixel samples from known pixel samples, thus potentially increasing a quantity of candidate prediction blocks that may be used to encode a picture block. Upon receiving a motion vector corresponding to a prediction unit (PU) of the current picture block, the motion compensation unit may locate a prediction block to which the motion vector points in one of reference picture lists.

The motion compensation unit may further generate syntax elements related to a block and a video slice for use by the video decoder 30 in decoding picture blocks of the video slice. In addition or as an alternative to slices and respective syntax elements, tile groups and/or tiles and respective syntax elements may be generated or used.
Entropy Encoding:

The entropy encoding unit 270 is configured to apply, for example, an entropy coding algorithm or scheme (for example, a variable length coding (VLC) scheme, a context adaptive VLC (CAVLC) scheme, an arithmetic coding scheme, a binarization algorithm, context adaptive binary arithmetic coding (CABAC), syntax-based CABAC (SBAC), probability interval partitioning entropy (PIPE) coding or another entropy coding methodology or technique) on the quantized residual coefficient 209, inter prediction parameters, intra prediction parameters, loop filter parameters and/or other syntax elements to obtain encoded picture data 21 which can be output via the output 272, for example, in the form of an encoded bitstream 21, so that, for example, the video decoder 30 may receive and use the parameters for decoding. The encoded bitstream 21 may be transmitted to the video decoder 30, or stored in a memory for later transmission or retrieval by the video decoder 30.

Other structural variations of the video encoder 20 may be used to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 combined into a single unit.
Decoder and Decoding Method:

FIG. 3 is an example block diagram of the video decoder 30 according to an embodiment of this disclosure. The video decoder 30 is configured to receive the encoded picture data 21 (for example, the encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles) and related syntax elements.

In the example of FIG. 3, the decoder 30 includes an entropy decoding unit 304, an inverse quantization unit 310, an inverse transform processing unit 312, a reconstruction unit 314 (for example, an adder 314), a loop filter 320, a DPB 330, a mode application unit 360, an inter prediction unit 344, and an intra prediction unit 354. The inter prediction unit 344 may be or include a motion compensation unit. In some examples, the video decoder 30 may perform a decoding process generally reciprocal to the encoding process described with reference to the video encoder 100 in FIG. 2.

As explained with regard to the encoder 20, the inverse quantization unit 210, the inverse transform processing unit 212, the reconstruction unit 214, the loop filter 220, the DPB 230, the inter prediction unit 344 and the intra prediction unit 354 are further referred to as forming a "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video encoder 20 apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, for example, a quantization coefficient 309 and/or a decoded coding parameter (not shown in FIG. 3), for example, any or all of inter prediction parameters (for example, a reference picture index and a motion vector), intra prediction parameters (for example, an intra prediction mode or an index), transform parameters, QPs, loop filter parameters, and/or other syntax elements. The entropy decoding unit 304 may be configured to apply the decoding algorithms or schemes corresponding to the encoding schemes as described with regard to the entropy encoding unit 270 of the encoder 20. The entropy decoding unit 304 may be further configured to provide inter prediction parameters, intra prediction parameters and/or other syntax elements to the mode application unit 360 and other parameters to other units of the decoder 30. The video decoder 30 may receive the syntax elements at the video slice level and/or the video block level. In addition or as an alternative to slices and respective syntax elements, tile groups and/or tiles and respective syntax elements may be received or used.

Inverse Quantization:

The inverse quantization unit 310 may be configured to receive a QP (or in general information related to the inverse quantization) and a quantization coefficient from the encoded picture data 21 (for example, by parsing and/or decoding, for example, by the entropy decoding unit 304) and to apply based on the QP an inverse quantization on the decoded quantization coefficient 309 to obtain a dequantization coefficient 311 that may also be referred to as a transform coefficient 311. The inverse quantization process may include use of a QP calculated by the video encoder 20 for each video block in a video slice to determine a degree of quantization and, likewise, a degree of inverse quantization that needs to be applied.

Inverse Transform:

The inverse transform processing unit 312 may be configured to receive the dequantization coefficient 311, also referred to as the transform coefficient 311, and to apply a transform to the dequantization coefficient 311 to obtain the reconstructed residual block 213 in the sample domain. The reconstructed residual block 213 may also be referred to as a transform block 313. The transform may be an inverse transform, for example, an inverse DCT, an inverse DST, an inverse integer transform, or a conceptually similar inverse transform process. The inverse transform processing unit 312 may be further configured to receive a transform parameter or corresponding information from the encoded picture data 21 (for example, by parsing and/or decoding, for example, by the entropy decoding unit 304) to determine the transform to be applied to the dequantization coefficient 311.

Reconstruction:

The reconstruction unit 314 (for example, the adder 314) may be configured to add the reconstructed residual block 313 to the prediction block 365 to obtain a reconstructed block 315 in the sample domain, for example, by adding sample values of the reconstructed residual block 313 and sample values of the prediction block 365.

Filtering:

The loop filter unit 320 (either in the coding loop or after the coding loop) is configured to filter the reconstructed block 315 to obtain a filtered block 321, for example, to smooth pixel transitions, or otherwise improve video quality. The loop filter unit 320 may include one or more loop filters such as a de-blocking filter, an SAO filter or one or more other filters, for example, an ALF, an NSF, or any combination thereof. In an example, the loop filter unit 220 may include the de-blocking filter, the SAO filter, and the ALF filter. An order of a filtering process may be the de-blocking filter, the SAO filter, and the ALF filter. In another example, a process referred to as LMCS (namely, an adaptive in-loop reshaper) is added. This process is performed before de-blocking. In another example, a de-blocking filter process may be also applied to internal sub-block edges, for example, affine sub-blocks edges, ATMVP sub-blocks edges, SBT edges, and ISP edges. Although the loop filter unit 320 is shown in FIG. 3 as being a loop filter, in other configurations, the loop filter unit 320 may be implemented as a post loop filter.

Decoded Picture Buffer:

The decoded video block 321 of a picture is then stored in the DPB 330 that stores the decoded picture 331 as a reference picture for subsequent motion compensation for other pictures and/or for output respectively display.

The decoder 30 is configured to output the decoded picture 331, for example, via the output 332, for presentation or viewing to a user.

Prediction:

The inter prediction unit 344 may be identical to the inter prediction unit 244 (in particular to the motion compensation unit) in function, and the intra prediction unit 354 may be identical to the intra prediction unit 254 in function. The inter prediction unit 344 and the intra prediction unit 354 perform splitting or partitioning decisions and prediction based on the partitioning and/or prediction parameter or respective information received from the encoded picture data 21 (for example, by parsing and/or decoding, for example, by the entropy decoding unit 304). The mode application unit 360 may be configured to perform the prediction (intra or inter prediction) per block based on reconstructed blocks, blocks or respective samples (filtered or unfiltered) to obtain the prediction block 365.

When the video slice is coded as an intra coded (I) slice, the intra prediction unit 354 of the mode application unit 360 is configured to generate the prediction block 365 for a picture block of the current video slice based on an indicated intra prediction mode and data from previously decoded blocks of the current picture. When the video picture is coded as an inter coded (for example, B, or P) slice, the inter prediction unit 344 (for example, the motion compensation unit) of the mode application unit 360 is configured to produce the prediction block 365 for a video block of the current video slice based on the motion vectors and other syntax elements received from the entropy decoding unit 304. For inter prediction, the prediction blocks may be produced from one of the reference pictures within one of the reference picture lists. The video decoder 30 may construct the reference frame lists, for example, a list 0 and a list 1, using default construction techniques based on reference pictures stored in the DPB 330. The same or similar process may be applied for or by embodiments using tile groups (for example, video tile groups) and/or tiles (for example, video tiles) in addition or alternatively to slices (for example, video slices), for example, a video may be encoded using I, P or B tile groups and/or tiles.

The mode application unit 360 is configured to determine prediction information for a video block of the current video slice by parsing the motion vectors and other syntax elements, and use the prediction information to produce the prediction blocks for the current video block being decoded. For example, the mode application unit 360 uses some of the received syntax elements to determine a prediction mode (for example, intra or inter prediction) used to encode the video blocks of the video slice, an inter prediction slice type (for example, B slice, P slice, or generalized P/B (GPB) slice), construction information for one or more of the reference picture lists for the slice, motion vectors for each inter coded video block of the slice, inter prediction status for each inter coded video block of the slice, and other information to decode the video blocks in the current video slice. The same or similar process may be applied for or by embodiments using tile groups (for example, video tile groups) and/or tiles (for example, video tiles) in addition or alternatively to slices (for example, video slices), for example, a video may be encoded using I, P or B tile groups and/or tiles.

In an embodiment, the video decoder 30 shown in FIG. 3 may be further configured to partition and/or decode the picture by using slices (or video slices), where a picture may be partitioned into or decoded using one or more slices (typically non-overlapping). Each slice may include one or more blocks (for example, CTUs) or one or more groups of blocks (for example, tiles in the H.265/HEVC/VVC standard and bricks in the VVC standard).

In an embodiment, the video decoder 30 as shown in FIG. 3 may be further configured to partition and/or decode the picture by using slices/tile groups (or video tile groups) and/or tiles (or video tiles), where a picture may be partitioned into or decoded using one or more slices/tile groups (typically non-overlapping), and each slice/tile group may include, for example, one or more blocks (for example, CTUs) or one or more tiles, where each tile, for example, may be of rectangular shape and may include one or more blocks (for example, CTUs), for example, complete or fractional blocks.

Other variations of the video decoder 30 may be used to decode the encoded picture data 21. For example, the decoder 30 can produce the output video stream without the loop filtering unit 320. For example, a non-transform based decoder 30 can inverse-quantize the residual signal directly without the inverse transform processing unit 312 for some blocks or frames. In another implementation, the video decoder 30 may have the inverse quantization unit 310 and the inverse transform processing unit 312 combined into a single unit.

It should be understood that, in the encoder 20 and the decoder 30, a processing result of a current step may be further processed and then output to a next step. For example, after interpolation filtering, motion vector derivation, or loop filtering, a further operation, such as, a clip or a shift operation may be performed on a processing result of the interpolation filtering, motion vector derivation, or loop filtering.

It should be noted that further operations may be applied to derived motion vectors of the current block (including but not limit to control point motion vectors in affine mode, sub-block motion vectors in affine, planar, ATMVP modes, temporal motion vectors, and so on). For example, a value of a motion vector is constrained to a predefined range according to its representing bit. If the representing bit of the motion vector is bitDepth, then a range is $-2^{(\text{biltDepth}-1)}$ to $2^{(\text{bitDepth}-1)}-1$, where "^" indicates power. For example, if the bitDepth is set to 16, the range is −32768 to 32767, and if the bitDepth is set to 18, the range is −131072 to 131071. For example, the value of the derived motion vector (for example, the MVs of four 4×4 sub-blocks within one 8×8 block) is constrained such that the max difference between integer parts of the four 4×4 sub-block MVs is no more than N pixels, such as no more than 1 pixel. Two methods for constraining the motion vector based on the bitDepth are provided herein.

Although embodiments have been primarily described based on video coding, it should be noted that embodiments of the coding system 10, the encoder 20 and the decoder 30 and the other embodiments described in the specification may also be configured for still picture processing or coding, that is, processing or coding of an individual picture independent of any preceding or consecutive picture in video coding. In general, if picture processing is limited to a single picture 17, the inter prediction unit 244 (encoder) and the inter prediction unit 344 (decoder) may not be available. All other functionalities (or tools or technologies) of the video encoder 20 and the video decoder 30 may equally be used for still picture processing, for example, residual calculation 204/304, transform 206, quantization 208, inverse quantization 210/310, (inverse) transform 212/312, partitioning 262/362, intra prediction 254/354, and/or loop filtering 220/320, entropy encoding 270 and entropy decoding 304.

Figure 4:
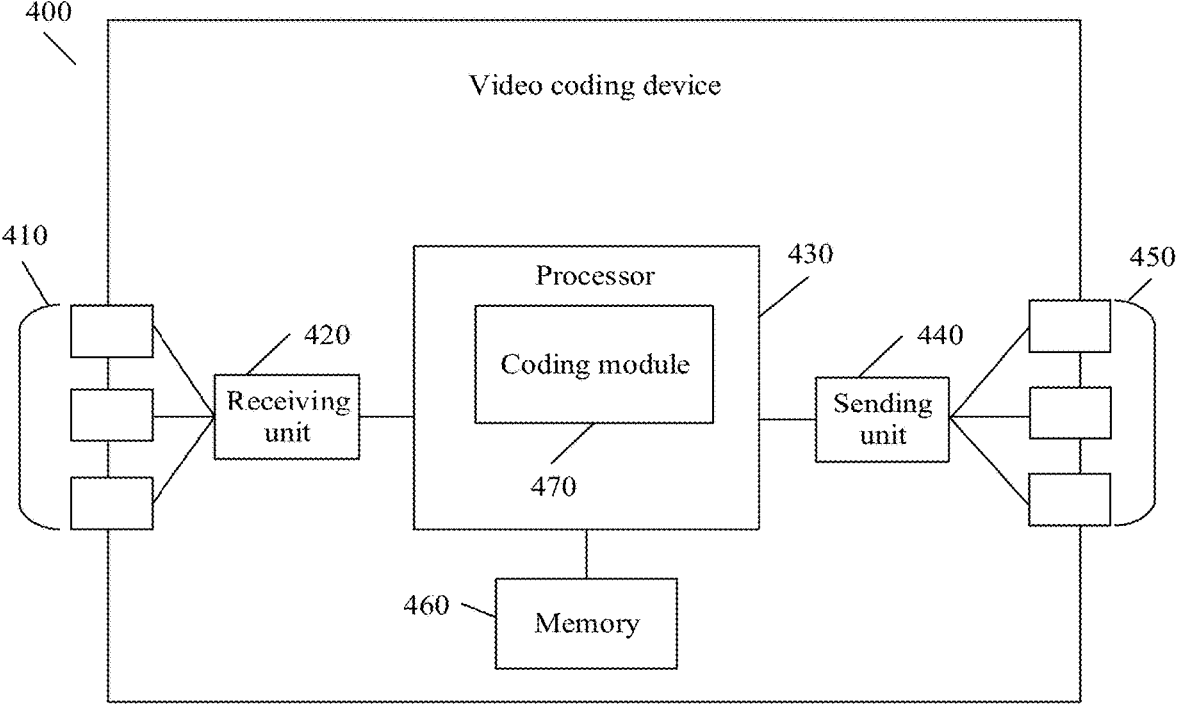
FIG. 4 is an example block diagram of a video coding device according to an embodiment of this disclosure.

FIG. 4 is an example block diagram of a video coding device 400 according to an embodiment of this disclosure. The video coding device 400 is suitable for implementing the disclosed embodiments as described herein. In an embodiment, the video coding device 400 may be a decoder such as the video decoder 30 in FIG. 1A or an encoder such as the video encoder 20 in FIG. 1A.

The video coding device 400 includes ingress ports 410 (or input ports 410) and a receiving unit (Rx) 420 that are configured to receive data, a processor, logical unit, or central processing unit (CPU) 430 for processing data, a sending unit (or transmitter unit) (Tx) 440 and egress ports 450 (or output ports 450) that are configured to transmit data, a memory 460 for storing data. The video coding device 400 may also include optical-to-electrical (OE) components and electrical-to-optical (EO) components coupled to the ingress ports 410, the receiving unit 420, the transmitter unit 440, and the egress ports 450 for egress or ingress of optical or electrical signals.

The processor 430 is implemented by hardware and software. The processor 430 may be implemented as one or more CPU chips, cores (for example, a multi-core processor), FPGAS, ASICs, and DSPs. The processor 430 is in communication with the ingress ports 410, the receiving unit 420, the transmitter unit 440, the egress ports 450, and the memory 460. The processor 430 includes a coding module 470. The coding module 470 implements the disclosed embodiments described above. For example, the coding module 470 implements, processes, prepares, or provides various coding operations. Therefore, the coding module 470 provides a substantial improvement to functions of the video coding device 400 and affects a switching of the video coding device 400 to a different state. Alternatively, the coding module 470 is implemented by instructions stored in the memory 460 and executed by the processor 430.

The memory 460 includes one or more disks, tape drives, and solid-state drives and may be used as an over-flow data storage device, to store programs when such programs are selected for execution, and to store instructions and data that are read during program execution. The memory 460 may be volatile and/or non-volatile, and may be a read-only memory (ROM), a RAM, a ternary content-addressable memory (TCAM) and/or a SRAM.

Scalable video coding, also known as scalable video coding, is an extended coding standard of current video coding standards (generally, extended-standard scalable video coding (SVC) of AVC (H.264), or extended-standard scalable HEVC (SHVC) of HEVC (H.265)). The scalable video coding is mainly used to resolve the problems of packet loss and delay jitter caused by a real-time change of a network bandwidth in real-time video transmission.

In the scalable video coding, a basic structure may be referred to as a level. A scalable video coding technology may obtain bitstreams of levels of different resolutions by performing spatial domain scaling (resolution scaling) on an original picture block. The resolution may be a size of a picture block in a unit of pixels. A resolution of a low level is low, and a resolution of a high level is not lower than that of the low level. Alternatively, bitstreams of levels of different frame rates may be obtained by performing temporal domain scaling (frame rate scaling) on the original picture block. The frame rate may be a quantity of picture frames included in a video per unit time. A frame rate of a low level is low, and a frame rate of a high level is not lower than that of the low level. Alternatively, bitstreams of levels of different coding qualities may be obtained by performing quality domain scaling on the original picture block. The coding quality may be quality of a video. A picture distortion degree of a low level is high, and a picture distortion degree of a high level is not higher than that of the low level.

Generally, a layer referred to as a base layer is a bottom-most layer in the scalable video coding. In spatial domain scaling, a base layer picture block is coded using a lowest resolution. In temporal domain scaling, a base layer picture block is coded using a lowest frame rate. In quality domain scaling, a base layer picture block is coded using a highest QP or a lowest bit rate. In other words, the base layer has lowest quality in the scalable video coding. A level referred to as an enhancement layer is a level above the base layer in the scalable video coding, and may be divided into a plurality of enhancement layers from low to high. A lowest-layer enhancement layer codes, based on coding information obtained by the base layer, to obtain a combined bitstream whose coding resolution is higher than that of the base layer, or frame rate is higher than that of the base layer, or bit rate is higher than that of the base layer. A higher-layer enhancement layer may code, based on coding information of a lower-layer enhancement layer, to obtain a picture block with higher quality.

For example, FIG. 5 is a schematic diagram of an example of a level of scalable video encoding according to this disclosure. As shown in FIG. 5, after an original picture block is sent to a scalable coder, the original picture block may be layered into a base layer picture block B and an enhancement layer picture block (E1 to En, where n is greater than or equal to 1) according to different coding configurations, and then coding is performed separately to obtain a bitstream including a base layer bitstream and an enhancement layer bitstream. The base layer bitstream is generally a bitstream obtained by using a lowest resolution, a lowest frame rate, or a lowest coding quality parameter for a picture block. The enhancement layer bitstream is a bitstream obtained by coding a picture block by using a high resolution, a high frame rate, or a high coding quality parameter on the basis of the base layer. As a quantity of enhancement layers increases, a spatial domain level, temporal domain level, or quality level of coding also increases.

When an encoder transmits bitstreams to a decoder, the encoder preferably ensures transmission of base layer bitstreams. When a network has a margin, the encoder transmits bitstreams of increasingly high levels gradually. The decoder first receives and decodes the base layer bitstream, decodes, based on received enhancement layer bitstreams, bitstreams of increasingly high levels in spatial domain, temporal domain, or quality layer by layer from a low level to a high level, and then, superimposes decoding information at a high level on a reconstructed block at a low level, to obtain a reconstructed block with a high resolution, a high frame rate, or high quality.

Figure 6:
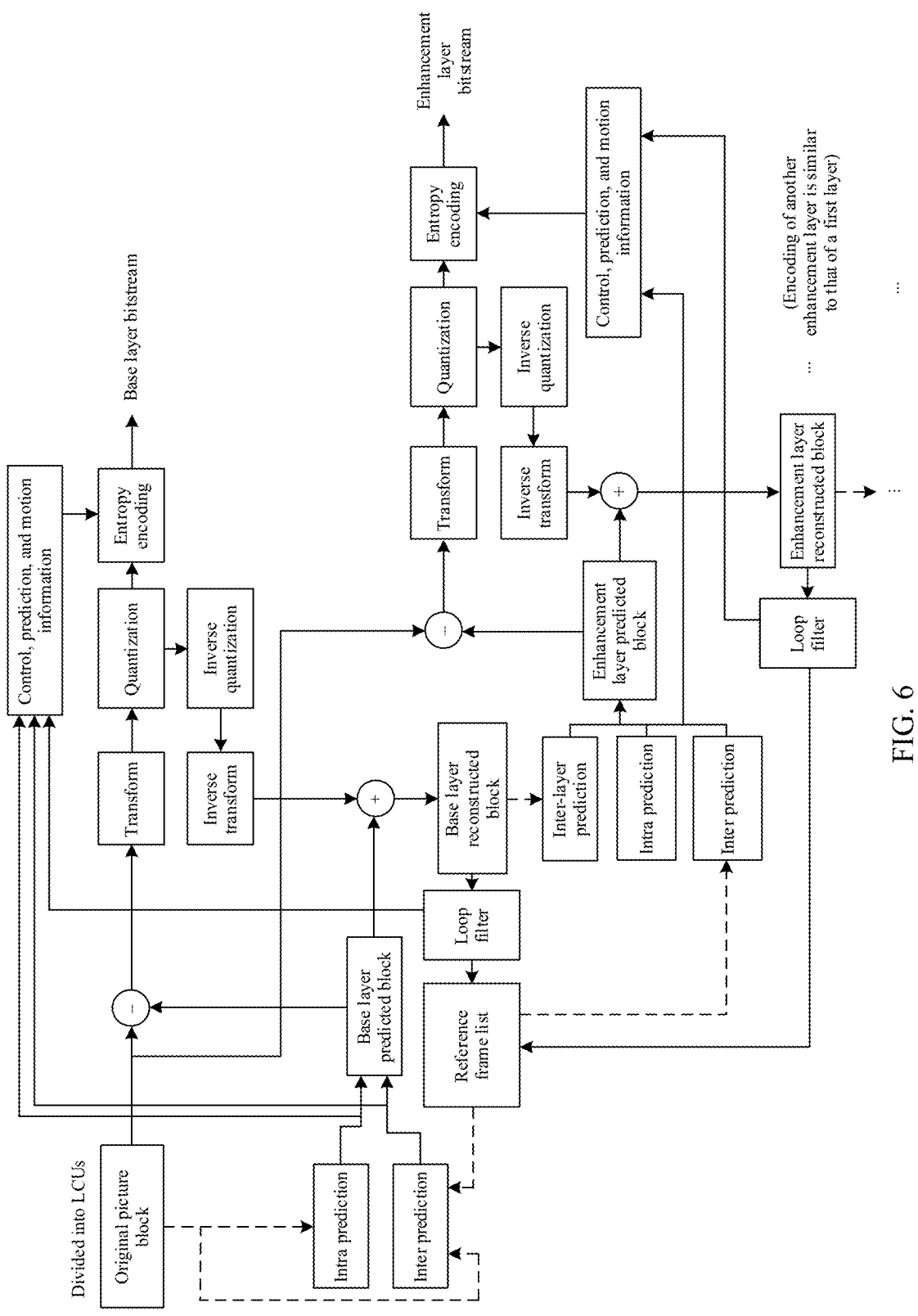
FIG. 6 is an example flowchart of an enhancement layer encoding method according to this disclosure.

As described above, each picture of a video sequence is typically partitioned into a set of non-overlapping blocks, and coding is typically performed at a block level. To be specific, at the encoder, a video is usually processed, that is, encoded, at a block (picture block) level. For example, a prediction block is generated through spatial (intra) prediction and temporal (inter) prediction, the prediction block is subtracted from a picture block (block being processed or to be processed) to obtain a residual block, and the residual block is transformed in a transform domain and quantized to reduce an amount of data that is to be transmitted (compressed). The encoder further needs to perform inverse quantization and inverse transform to obtain a reconstructed residual block, and then obtain a reconstructed block by adding a sample value of the reconstructed residual block with a sample value of the prediction block. A reconstructed block of the base layer is a reconstructed block obtained by performing the foregoing operations on a base layer picture block obtained by layering the original picture block. For example, FIG. 6 is an example flowchart of an enhancement layer encoding method according to this disclosure. As shown in FIG. 6, an encoder obtains a prediction block of a base layer based on an original picture block (for example, a largest coding unit (LCU)), obtains a difference between corresponding samples in the original picture block and the prediction block of the base layer to obtain a residual block of the base layer, splits the residual block of the base layer, performs transform and quantization, performs entropy encoding together with coding control information, prediction information, motion information, and the like of the base layer, to obtain a bitstream of the base layer. The encoder performs inverse quantization and inverse transform on a quantized quantization coefficient to obtain a reconstructed residual block of the base layer, and then sums corresponding samples in the prediction block of the base layer and the reconstructed residual block of the base layer, to obtain a reconstructed block of the base layer.

A picture (for example, a current picture or a previous frame) in the following may be an LCU in an entire frame of picture, an entire frame of picture, or a region of interest (ROI) in an entire frame of picture, namely, a specified picture area that needs to be processed in the picture, or a picture slice in a frame of picture.

Based on the foregoing description, this disclosure provides a picture encoding method and a picture decoding method, to resolve a problem that artifacts are caused by a change of a channel condition in the scalable coding technology.

FIG. 7 is an example flowchart of a picture encoding method according to this disclosure. A process 700 may be performed by the video encoder 20 (or an encoder). The process 700 is described as a series of steps or operations. It should be understood that the steps or operations of the process 700 may be performed in various sequences and/or simultaneously, and are not limited to an execution sequence shown in FIG. 7. The process 700 includes the following steps.

Step 701: Determine a reference frame number of a current picture based on channel feedback information.

Optionally, the channel feedback information comes from a corresponding decoder side and/or a network device on a transmission link. An encoder side may send a bitstream to one or more decoder sides, so that the decoder side that receives the bitstream parses the bitstream to reconstruct a picture frame. For the bitstream, from the encoder side to the decoder side, in addition to devices at a transmitting end (the encoder side) and a receiving end (the decoder side), a network device on a transmission link between the encoder side and the decoder side, for example, a switch, a repeater, a base station, a hub, a router, a firewall, a bridge, a gateway, a network interface card (NIC), a printer, a modem, an optical fiber transceiver, or an optical cable may be further included. To enable the encoder side to know a condition of the transmission link, the decoder side may send the channel feedback information to the encoder side. Similarly, the channel feedback information may alternatively be sent to the encoder side by the network device on the transmission link. A transmitter of the channel feedback information is not further limited in this disclosure.

The decoder side and/or the network device on the transmission link may parse the received bitstream to determine a frame number and a layer number corresponding to the bitstream, and then send the channel feedback information to the encoder side. The channel feedback information carries the frame number and the layer number corresponding to the foregoing bitstream, to inform the encoder side of a specific layer of a specific frame that has been received by the decoder side and/or the network device.

In this disclosure, the decoder side may periodically send channel feedback information to the encoder side. The channel feedback information carries a frame number and a layer number corresponding to a newly received bitstream. Alternatively, the decoder side may send channel feedback information when learning, through parsing, that a bitstream of a next frame starts to be received (determined based on a frame number in the bitstream). The channel feedback information carries a frame number of a previous frame and a highest layer number received in the previous frame. Alternatively, the decoder side may send channel feedback information when learning, through parsing, that the current picture is completely received (determined based on a highest layer number of the current picture in the bitstream). The feedback information carries a frame number of the current picture and a highest layer number received in the current picture. In addition, the decoder side may further send the channel feedback information in another manner. This is not limited.

Optionally, the channel feedback information is generated based on a sent bitstream. In a reliability-based transmission channel mode, when sending a bitstream, the encoder side does not need to wait for feedback from the decoder side or the network device on the transmission link, and may know a channel condition based on a condition of receiving or sending a signal through a communication interface. Therefore, the encoder side may adjust sending of the bitstream based on the known channel condition. The encoder side may consider that the sent bitstream can definitely be received by the decoder side. Therefore, the encoder side may generate the channel feedback information based on a frame number and a layer number corresponding to the sent bitstream. Similarly, the encoder side may periodically generate the channel feedback information, or may generate the channel feedback information whenever a bitstream of one picture frame is sent. This is not limited.

It can be learned that the channel feedback information indicates information about a picture frame received by the decoder side. For example, a total quantity of layers of a current picture frame is 4, and an encoder side encodes the current picture frame to obtain bitstreams corresponding to four layers. However, during transmission, a decoder side receives only bitstreams corresponding to three layers of the current picture frame. In this case, when encoding a next frame, the encoder side uses a reconstructed picture of a $4^{th}$ layer of the current picture as a reference picture, but the decoder side does not receive a bitstream corresponding to the $4^{th}$ layer. Therefore, the decoder side cannot decode the next frame by using the reconstructed picture of the $4^{th}$ layer of the current picture as a reference picture. As a result, a decoding error occurs in the next frame. Therefore, in this disclosure, the encoder side first obtains the channel feedback information, determines, based on the channel feedback information that includes a frame number and a layer number of the picture frame received by the decoder side, the information about the picture frame received by the decoder side, and then determines a reference frame of a next frame based on the information about the picture frame received by the decoder side. This avoids the case in the foregoing example, and ensures that reference pictures used by the encoder side and the decoder side are consistent.

In a possible implementation, when there is only one decoder side, the encoder side may first obtain a plurality of pieces of channel feedback information from the decoder side, and then determine, as the reference frame number of the current picture, a frame number that is in a plurality of frame numbers indicated by the plurality of pieces of channel feedback information and that is closest to a frame number of the current picture.

As described above, the channel feedback information indicates the information about the picture frame received by the decoder side, and includes the frame number and the layer number of the picture frame received by the decoder side. The encoder side obtains the plurality of pieces of channel feedback information, and the channel feedback information reflects frame numbers and layer numbers corresponding to bitstreams received by the decoder side at different moments. Therefore, the frame number that is in the plurality of frame numbers respectively indicated by the plurality of pieces of channel feedback information and that is closest to the frame number of the current picture may be determined as the reference frame number of the current picture. For example, an encoder side obtains three pieces of channel feedback information, a frame number indicated by one piece of channel feedback information is 1, a frame number indicated by another piece of channel feedback information is 2, a frame number indicated by the other piece of channel feedback information is 1, and the current picture is a third frame. Therefore, the encoder side can determine that the reference frame number of the current picture is 2.

In a possible implementation, when there is a plurality of decoder sides, the encoder side may first obtain a plurality of groups of channel feedback information, where the plurality of groups of channel feedback information correspond to the plurality of decoder sides, and each group of channel feedback information includes a plurality of pieces of channel feedback information. One or more common frame numbers are determined based on the plurality of groups of channel feedback information, where the common frame number is a frame number indicated by at least one piece of channel feedback information in each group of channel feedback information. Then, the reference frame number of the current picture is determined based on the one or more common frame numbers.

As described above, the channel feedback information indicates the information about the picture frame received by the decoder side, and includes the frame number and the layer number of the picture frame received by the decoder side. For each decoder side, the encoder side obtains a plurality of pieces of channel feedback information corresponding to the decoder side. The encoder side may determine the common frame number based on the plurality of groups of channel feedback information corresponding to the plurality of decoder sides. The common frame number is the frame number indicated by the at least one piece of channel feedback information in each group of channel feedback information. In other words, the common frame number is a frame number indicated in a group of channel feedback information fed back by each decoder side. If there is only one common frame number, the encoder side may determine the common frame number as the reference frame number of the current picture. If there are a plurality of common frame numbers, a largest common frame number among the plurality of common frame numbers may be determined as the reference frame number of the current picture. For example, a decoder side A corresponds to three pieces of channel feedback information, and separately indicated frame numbers are 1, 2, 3, and 4. A decoder side B corresponds to three pieces of channel feedback information, and separately indicated frame numbers are 2, 3, 4, and 5. A decoder side C corresponds to three pieces of channel feedback information, and separately indicated frame numbers are 2, 3, 4, and 6. It can be determined that common frame numbers are 2, 3, and 4, and a largest frame number is 4. Therefore, the reference frame number of the current picture is 4.

Step 702: Obtain a first reference layer number set of a first picture frame corresponding to the reference frame number, where the first reference layer number set includes layer numbers of N1 layers.

The first picture frame corresponding to the reference frame number is a picture frame indicated by the reference frame number determined in the step 701. In this disclosure, a maximum quantity of layers $L_{max}$, for example, 6, of a picture frame in a video during scalable encoding may be preset. The maximum quantity of layers may be a threshold. In other words, a quantity of layers of each picture frame during layering does not exceed the quantity of layers. However, during actual encoding, for different picture frames, different total quantities of layers may be obtained. A total quantity of layers of the first picture frame is indicated by L1, and L1 may be less than or equal to the foregoing maximum quantity of layers $L_{max}$. After the first picture frame is divided into L1 layers, the N1 layers of the L1 layers may be used as reference pictures of a subsequent picture frame, where $1 \leq N1 < L1$. The layer numbers of the N1 layers form the first reference layer number set of the first picture frame. In other words, the first picture frame corresponds to the first reference layer number set, and only a reconstructed picture of a layer whose layer number is in the first reference layer number set can be used as the reference frame of the subsequent picture frame. Another picture frame in the video is similar. Details are not described herein again.

In this disclosure, the N1 layers may be preset. For example, the first reference layer number set $Rx=\{1, 4, 6\}$, and L1=6. In other words, the encoder side divides a picture frame into six layers in total during encoding. Layer numbers that are of the picture frame and that can be used as a reference frame for a subsequent picture frame are 1, 4, and 6.

A value of N1 is not limited in this disclosure. For example, N1 may be set based on a chip capability, or may be dynamically set based on real-time encoding and a network feedback condition. For example, N1 does not exceed half of a total quantity of layers, and a layer number interval may be 2. For example, if L1=6, the first reference layer number set $Rx=\{1, 3, 5\}$. Alternatively, the N1 layers include a highest layer number, for example, L1=6, and the first reference layer number set $Rx=\{1, 3, 6\}$.

It should be understood that each frame in the video may have an independent and different reference layer number set. Alternatively, picture frames in the video are divided into a plurality of groups, and one group of picture frames may have a same reference layer number set. Alternatively, all picture frames in the video may have a same reference layer number set. This is not limited in this disclosure.

Step 703: Determine a reference layer number of the current picture based on the channel feedback information and the first reference layer number set.

In a possible implementation, when there is only one decoder side, the encoder side may determine, as a target layer number, a highest layer number indicated by channel feedback information indicating the reference frame number.

As described above, the reference frame number is determined based on the channel feedback information, and the encoder side may further determine the target layer number based on a reference layer number indicated by channel feedback information indicating a corresponding reference frame number. When there is only one piece of channel feedback information indicating the reference frame number, a layer number indicated by the channel feedback information is the highest layer number, and is directly determined as the target layer number. When there is a plurality of pieces of channel feedback information indicating the reference frame number, a largest layer number among layer numbers respectively indicated by the plurality of pieces of channel feedback information is determined as the target layer number. For example, an encoder side obtains that a frame number indicated by three pieces of channel feedback information is 2, and 2 is the reference frame number of the current picture. A layer number indicated by one piece of channel feedback information is 3, a layer number indicated by another piece of channel feedback information is 4, and a layer number indicated by the other piece of channel feedback information is 5. In this way, to improve quality of a picture, the layer number 5 may be determined as the target layer number.

When the reference layer number set includes the target layer number, the target layer number is determined as the reference layer number of the current picture. Alternatively, when the reference layer number set does not include the target layer number, a layer number that is in the reference layer number set and that is less than and closest to the target layer number is determined as the reference layer number of the current picture.

In the step 701, the reference frame number of the current picture is determined, and it may be determined that a reference picture of the current picture comes from a picture frame corresponding to the reference frame number. In the step 702, the reference layer number set of the picture frame corresponding to the reference frame number is determined, and it may be determined that the reference picture of the current picture is one of reconstructed pictures respectively corresponding to the layer numbers of the N1 layers included in the reference layer number set of the picture frame corresponding to the reference frame number.

Based on this, after the target layer number is determined, whether the target layer number falls within the reference layer number set of the picture frame corresponding to the reference frame number may be first queried. If the reference layer number set includes the target layer number, the target layer number may be determined as the reference layer number of the current picture. If the reference layer number set does not include the target layer number, the layer number that is less than the target layer number and closest to the target layer number needs to be found in the reference layer number set, and the layer number is determined as the reference layer number of the current picture. For example, if a reference layer number set Rx is $\{1, 3, 5\}$, a target layer number is 4, and a layer number that is in the reference layer number set Rx and that is less than and closest to the target layer number is 3, 3 is the reference layer number of the current picture.

In a possible implementation, when there is a plurality of decoder sides, the encoder side may obtain a highest layer number indicated by channel feedback information that is in each group of a plurality of groups of channel feedback information and that indicates the reference frame number, and determine a smallest highest layer number among the plurality of highest layer numbers as the target layer number.

As described above, the reference frame number is determined based on the channel feedback information, and the encoder side may further determine the target layer number based on the channel feedback information indicating the reference frame number. Because the reference frame number is first a common frame number indicated by the plurality of groups of channel feedback information corresponding to the plurality of decoder sides, it can be learned that each decoder side respectively corresponds to at least one piece of channel feedback information indicating the reference frame number. A largest layer number among layer numbers indicated by the channel feedback information indicating the reference frame number of each decoder side may be determined, and then a minimum value among the highest layer numbers respectively corresponding to the decoder sides is taken as the target layer number. For example, if the reference frame number is 2, and layer numbers indicated by channel feedback information indicating the reference frame number 2 of a decoder side A include 1, 3, and 4, corresponding to the reference frame number 2, a highest layer number 4 is used. Layer numbers indicated by channel feedback information indicating the reference frame number 2 of a decoder side B include 1, 3, and 6, and corresponding to the reference frame number 2, a highest layer number 6 is used. Layer numbers indicated by channel feedback information indicating the reference frame number 2 of a decoder side C include 3, 4, and 6, and corresponding to the reference frame number 2, a highest layer number 6 is used. Then, a minimum value among the highest layer numbers is used, so that the target layer number is determined to be 4.

Similarly, when the reference layer number set includes the target layer number, the target layer number is determined as the reference layer number of the current picture. Alternatively, when the reference layer number set does not include the target layer number, a layer number that is in the reference layer number set and that is less than and closest to the target layer number is determined as the reference layer number of the current picture.

In the step 701, the reference frame number of the current picture is determined, and it may be determined that a reference picture of the current picture comes from a picture frame corresponding to the reference frame number. In the step 702, the reference layer number set of the picture frame corresponding to the reference frame number is determined, and it may be determined that the reference picture of the current picture is one of reconstructed pictures respectively corresponding to the layer numbers of the N1 layers included in the reference layer number set of the picture frame corresponding to the reference frame number.

Based on this, after the target layer number is determined, whether the target layer number falls within the reference layer number set of the picture frame corresponding to the reference frame number may be first queried. If the reference layer number set includes the target layer number, the target layer number may be determined as the reference layer number of the current picture. If the reference layer number set does not include the target layer number, the layer number that is less than the target layer number and closest to the target layer number needs to be found in the reference layer number set, and the layer number is determined as the reference layer number of the current picture. For example, if a reference layer number set Rx is $\{1, 3, 5\}$, a target layer number is 6, and a layer number that is in the reference layer number set Rx and that is less than and closest to the target layer number is 5, 5 is the reference layer number of the current picture.

Step 704: Perform scalable video encoding on the current picture based on the reference frame number and the reference layer number to obtain a bitstream.

After the reference frame number and the reference layer number of the current picture are determined, a reconstructed picture corresponding to the reference frame number and the reference layer number may be extracted from a DPB as the reference picture of the current picture. Therefore, scalable encoding is performed on the current picture based on the reference picture to obtain the bitstream.

In this disclosure, in addition to the bitstream obtained through scalable encoding, the encoder side may further add the reference layer number set of the picture frame to the bitstream.

In this disclosure, the reference frame number of the current picture is determined based on the channel feedback information, and then the reference layer number of the current picture is determined based on the reference frame number and a preset reference layer number set. The reference layer number set includes layer numbers of N layers of a picture frame corresponding to the reference frame number. Then, the reference picture of the current picture is obtained based on the reference frame number and the reference layer number. In this way, for the obtained reference picture, a change of a channel is fully considered, that the reference pictures used by the encoder side and the decoder side are consistent is ensured, to improve encoding efficiency, and avoid artifacts.

In a possible implementation, the DPB stores only reconstructed pictures of N1 layers for the picture frame corresponding to the reference frame number.

In a conventional technology, for a picture frame corresponding to a reference frame number, after performing scalable encoding on the picture frame, an encoder side needs to store reconstructed pictures of all layers of the picture frame in a DPB. For example, L1 of the picture frame corresponding to the reference frame number is 6, and the encoder side needs to store reconstructed pictures of six layers in the DPB. However, in this disclosure, only the reconstructed pictures corresponding to N1 layer numbers included in the reference layer number set of the picture frame corresponding to the reference frame number need to be stored. For example, L1 of a picture frame corresponding to a reference frame number is 6, and a reference layer number set Rx of the picture frame corresponding to the reference frame number is {1, 3, 5}. After encoding the picture frame, an encoder side only needs to store recon- structed pictures whose layer numbers are 1, 3, and 5 in a DPB. Compared with the conventional technology, in this disclosure, a quantity of the reconstructed pictures stored in the DPB is reduced, and a write bandwidth is reduced. This can improve an encoding processing speed and save space of the DPB.

In a possible implementation, the encoder side may first determine, as a target frame number, a frame number that is in a plurality of frame numbers indicated by the plurality of pieces of channel feedback information and that is closest to a frame number of the current picture, and determine whether a highest layer number indicated by channel feed- back information indicating the target frame number is greater than or equal to a highest layer number in a second reference layer number set. The second reference layer number set is a reference layer number set of a second picture frame corresponding to the target frame number. When the foregoing condition (that is, the highest layer number indicated by the channel feedback information indi- cating the target frame number is greater than or equal to the highest layer number in the second reference layer number set) is met, the target frame number is determined as the reference frame number.

For example, an encoder side determines, based on chan- nel feedback information, that a reference frame number of a fourth frame is 3 and a reference layer number is 4, but actually a decoder side receives a sixth layer of the picture frame whose frame number is 3. Therefore, when decoding the fourth frame, the decoder side may determine that the reference frame number of the fourth frame is 3 and the reference layer number of the fourth frame is 6. In this case, the encoder side and the decoder side use different reference pictures for the "fourth frame", resulting in a decoding error due to inconsistent encoding and decoding.

To resolve the foregoing problem, this disclosure provides the foregoing solution. The encoder side does not directly determine the frame number obtained based on the forego- ing condition as the reference frame number, but uses the frame number as the target frame number, and determines, based on the channel feedback information indicating the target frame number, whether the decoder side has received a picture layer whose layer number is greater than or equal to the highest layer number in the second reference layer number set. If the highest layer number indicated by the channel feedback information already meets the condition that the highest layer number indicated by the channel feedback information is greater than or equal to the highest layer number in the second reference layer number set, even if the decoder side receives a higher layer of the second picture frame, according to the solution of determining the reference layer number in the step 703, the highest layer number in the second reference layer number set is still selected as the reference layer number. Therefore, in this case, the target frame number may be directly used as the reference frame number, and the problem that the reference layer numbers selected by the encoder side and the decoder side are inconsistent does not occur.

However, if the condition that the highest layer number indicated by the channel feedback information is greater than or equal to the highest layer number in the second reference layer number set is not met, the encoder side may determine a specified frame number in the plurality of frame numbers indicated by the plurality of pieces of channel feedback information as the reference frame number of the current picture. For example, an encoder side obtains three pieces of channel feedback information, a frame number indicated by one piece of channel feedback information is 1, a frame number indicated by another piece of channel feedback information is 2, a frame number indicated by the other piece of channel feedback information is 1, and the current picture is a third frame. Therefore, the target frame number determined by the encoder side is 2. However, the channel feedback information indicates that a decoder side receives a layer 4 of a frame 2, and the layer 4 is less than a highest layer number 6 in a reference layer number set Rx={1, 4, 6} of the frame 2. In this case, the encoder side may use a specified frame number 1 as the reference frame number.

In this disclosure, the specified frame number may be a frame number that is two frames earlier than that of the current picture, or may be a fixed frame number. This is not further limited.

In a possible implementation, the specified frame number and a specified layer number are preset, and the encoder side may determine the specified frame number as the reference frame number of the current picture. When the reference layer number set includes the specified layer number, the specified layer number is determined as the reference layer number of the current picture. Alternatively, when the ref- erence layer number set does not include the specified layer number, a layer number that is in the reference layer number set and that is less than and closest to the specified layer number is determined as the reference layer number of the current picture.

In other words, the encoder side may directly specify the reference frame number and the reference layer number of the current picture, to improve efficiency of determining the reference picture.

In a possible implementation, when the reference layer number set does not include the target layer number, if the reference layer number set does not include a layer number less than the target layer number, a reference frame number of a previous frame of the current picture is determined as the reference frame number of the current picture, and a reference layer number of the previous frame is determined as the reference layer number of the current picture.

For example, a reference layer number set Rx is {3, 5}, a target layer number is 2, and there is no layer number less than 2 in the reference layer number set Rx. Therefore, a reference frame number and a reference layer number that are determined in the previous frame may be directly used for the current picture.

Optionally, the encoder side may set a layer number 1 in each reference layer number set. In this way, there is no case in which the reference layer number set does not include a layer number less than the target layer number, and it is determined that the reference layer number of the current picture is 1.

In a possible implementation, when there is only one decoder side, the encoder side may add the reference frame number determined in the step 701 to the bitstream, so that the decoder side may determine the reference layer number by using the logic in the step 703. Alternatively, the encoder side may add the reference frame number determined in the step 701 and the reference layer number determined in the step 703 to the bitstream, so that the decoder side parses the bitstream to directly obtain the reference frame number and the reference layer number.

In a possible implementation, when there is a plurality of decoder sides, the encoder side may also add the reference frame number determined in the step 701 and the reference layer number determined in the step 703 to the bitstream, so that the decoder side parses the bitstream to directly obtain the reference frame number and the reference layer number.

In a possible implementation, when the current picture is a picture slice, the channel feedback information includes a picture slice number of the picture frame received by the decoder side and a layer number corresponding to the picture slice number, and determining a reference layer number of the current picture based on the channel feedback information and the first reference layer number set includes, if a picture slice number of the current picture is the same as the picture slice number of the picture frame received by the decoder side, determining, as a target layer number, a layer number corresponding to the picture slice number of the picture frame received by the decoder side, and when the first reference layer number set includes the target layer number, determining the target layer number as the reference layer number of the current picture, or when the first reference layer number set does not include the target layer number, determining, as the reference layer number of the current picture, a layer number that is in the first reference layer number set and that is less than and closest to the target layer number.

A frame of picture may be divided into a plurality of picture slices for encoding and sending. Therefore, when the current picture is the picture slice, in addition to the frame number of the picture frame received by the decoder side, the channel feedback information further includes the picture slice number of the picture frame received by the decoder side and the layer number corresponding to the picture slice number. In this way, the encoder side may first determine the reference frame number of the current picture by using the foregoing method, determine the reference layer number of the current picture based on the picture slice number of the current picture and the first reference layer number set, that is, find a same picture slice number as the picture slice number of the current picture from a plurality of picture slice numbers indicated by the channel feedback information indicating the reference frame number, determine a layer number corresponding to the same picture slice number as the target layer number, and determine the reference layer number of the current picture from the first reference layer number set based on the target layer number. For example, a reference frame number of a current picture is 1, a plurality of picture slice numbers indicated by channel feedback information indicating the frame number 1 include 1, 2, 3, and 4, the picture slice number 1 corresponds to a layer number 3, the picture slice number 2 corresponds to a layer number 4, the picture slice number 3 corresponds to a layer number 5, the picture slice number 4 corresponds to a layer number 6, and a first reference layer number set Rx is {1, 3, 5}. If a picture slice number of the current picture is 1, a reference layer number of the current picture is obtained based on the layer number 3 corresponding to the picture slice number 1 and the first reference layer number set, and the reference layer number of the current picture is 3. Alternatively, if a picture slice number of the current picture is 2, a reference layer number of the current picture is obtained based on the layer number 4 corresponding to the picture slice number 2 and the first reference layer number set, and the reference layer number of the current picture is 3. Alternatively, if a picture slice number of the current picture is 3, a reference layer number of the current picture is obtained based on the layer number 5 corresponding to the picture slice number 3 and the first reference layer number set, and the reference layer number of the current picture is 5. Alternatively, if a picture slice number of the current picture is 4, a reference layer number of the current picture is obtained based on the layer number 6 corresponding to the picture slice number 4 and the first reference layer number set, and the reference layer number of the current picture is 5.

FIG. 8 is an example flowchart of a picture decoding method according to this disclosure. A process 800 may be performed by the video decoder 30 (or a decoder). The process 800 is described as a series of steps or operations. It should be understood that the steps or operations of the process 800 may be performed in various sequences and/or simultaneously, and are not limited to an execution sequence shown in FIG. 8. The process 800 includes the following steps.

Step 801: Obtain a bitstream.

A decoder side may obtain the bitstream through a transmission link between the decoder side and an encoder side.

Step 802: Parse the bitstream to obtain a reference frame number of a current picture.

Refer to the embodiment shown in FIG. 7. The encoder side adds the reference frame number of the picture frame in the video to the bitstream. Therefore, the decoder side can determine the reference frame number of the current picture by parsing the bitstream.

Step 803: Obtain a third reference layer number set of a third picture frame corresponding to the reference frame number.

The third reference layer number set includes layer numbers of N2 layers, where $1 \le N2 < L2$, and L2 indicates a total quantity of layers of the third picture frame. The decoder side may parse the bitstream to obtain a reference layer number set of the picture frame in the video. For description of the reference layer number set, refer to the step 702 in the embodiment shown in FIG. 7. Details are not described herein again.

Step 804: Determine a reference layer number of the current picture based on the third reference layer number set.

If the bitstream does not carry a reference layer number of the picture frame, the decoder side may determine a highest layer number among layer numbers of a plurality of reconstructed pictures that are obtained through decoding and that are of the third picture frame. When the third reference layer number set of the third picture frame includes the highest layer number, the highest layer number is determined as the reference layer number of the current picture. Alternatively, when the third reference layer number set of the third picture frame does not include the highest layer number, a layer number that is in the third reference layer number set and that is less than and closest to the highest layer number is determined as the reference layer number of the current picture. If the third reference layer number set does not include a layer number less than the highest layer number, a reference frame number of a previous frame of the current picture is determined as the reference frame number of the current picture, and a reference layer number of the previous frame is determined as the reference layer number of the current picture.

Reference may be made to the step 703 in the embodiment shown in FIG. 7 herein. Details are not described herein again.

Step 805: Perform video decoding based on the reference frame number and the reference layer number to obtain a reconstructed picture of the current picture.

The decoder side may obtain, from a DPB, a reconstructed picture corresponding to the reference frame number and the reference layer number, use the obtained reconstructed picture corresponding to the reference frame number and the reference layer number as a reference picture, and perform video decoding based on the reference picture to obtain the reconstructed picture of the current picture.

In a possible implementation, after performing scalable decoding to obtain reconstructed pictures of L3 layers of the current picture, the decoder side may store reconstructed pictures of N3 layers of the current picture in the DPB. A fourth reference layer number set of the current picture includes layer numbers of M layers, the M layers include N3 layers, $1 \leq M < L3$, and L3 indicates a total quantity of layers of the current picture. Alternatively, a reconstructed picture of a highest layer among N3 layers is stored in the DPB.

The fourth reference layer number set of the current picture may be obtained by parsing the bitstream. However, during decoding of the decoder side, a layer number L4 of a highest layer obtained for the current picture may be less than the total quantity of layers L3 of the current picture. Therefore, when the reconstructed picture of the current picture is stored in the DPB, if L4 is greater than or equal to a highest layer number in the M layers, N3=M, or if L4 is less than a highest layer number in the M layers, N3<M.

Whenever the decoder side obtains a reconstructed picture of one layer of the current picture, the decoder side may determine whether a layer number of the layer falls within the fourth reference layer number set of the current picture. If the layer number falls within the fourth reference layer number set of the current picture, the decoder side may store a reconstructed picture of the layer in the DPB. Alternatively, if the layer number does not fall within the fourth reference layer number set of the current picture, the decoder side does not need to store a reconstructed picture of the layer in the DPB. In other words, only reconstructed pictures of N3 layers need to be stored for each frame of picture. For example, the fourth reference layer number set Rx of the current picture={1, 3, 5}, M=3, and the highest layer number L4 of the current picture obtained by the decoder side through decoding is 6>5. In this case, the decoder side only needs to store reconstructed pictures whose layer numbers are 1, 3, and 5 of the current picture in the DPB, and N3=3=M. For another example, the fourth reference layer number set Rx of the current picture={1, 3, 5}, M=3, and the highest layer number L4 of the current picture obtained by the decoder side through decoding is 4<5. In this case, the decoder side only needs to store reconstructed pictures whose layer numbers are 1 and 3 of the current picture in the DPB, and N3=2<M. Alternatively, after performing scalable decoding to obtain the reconstructed pictures of the layers of the current picture, the decoder side may store only a reconstructed picture of a highest layer among the N3 layers in the DPB. Whenever the decoder side obtains a reconstructed picture of one layer of the current picture, the decoder side may determine whether a layer number of the layer falls within the reference layer number set of the current picture. If the layer number falls within the reference layer number set of the current picture, the decoder side may store a reconstructed picture of the layer in the DPB, to directly overwrite a reconstructed picture that has been previously stored for the current picture. Alternatively, if the layer number does not fall within the reference layer number set of the current picture, the decoder side does not need to store a reconstructed picture of the layer in the DPB. For example, the fourth reference layer number set Rx of the current picture={1, 3, 5}, M=3, and the highest layer number L4 of the current picture obtained by the decoder side through decoding is 6>5. In this case, the decoder side only needs to reserve, in the DPB, a reconstructed picture whose layer number is 5 of the current picture. For another example, the fourth reference layer number set Rx of the current picture={1, 3, 5}, M=3, and the highest layer number L4 of the current picture obtained by the decoder side through decoding is 4. In this case, the decoder side only needs to reserve, in the DPB, a reconstructed picture whose layer number is 3 of the current picture. In this way, compared with a related technology, in this disclosure, a quantity of reconstructed pictures stored in the DPB is reduced, and a write bandwidth is reduced. This can improve a decoding processing speed and save space of the DPB.

In a possible implementation, the decoder side may display a reconstructed picture of an $L4^{th}$ layer of the current picture.

As described above, after the decoder side decodes to obtain the current picture, stored in the DPB is a reconstructed picture whose layer number falls within the fourth reference layer number set of the current picture or a reconstructed picture whose layer number falls within the fourth reference layer number set of the current picture and is a highest layer number in the fourth reference layer number set. However, when displaying the current picture obtained by decoding, the decoder side may display a reconstructed picture of a highest layer of the current picture obtained by decoding. For example, L4 of the current picture obtained by the decoder side through decoding is 6, a reconstructed picture whose layer number is 6 is displayed during displaying, and reconstructed pictures whose layer numbers are 1, 3, and 5 are stored in the DPB for decoding of a subsequent picture frame as a reference. For another example, L4 of the current picture obtained by the decoder side through decoding is 4, a reconstructed picture whose layer number is 4 is displayed during displaying, and reconstructed pictures whose layer numbers are 1 and 3 are stored in the DPB for decoding of a subsequent picture frame as a reference. In this way, quality of a picture displayed at the decoder side is better, viewing experience of a user is ensured, and storage space of the DPB can be saved.

In a possible implementation, the decoder side may determine a frame number and a layer number of a received picture frame, and then send channel feedback information to the encoder side. The channel feedback information indicates the frame number and the layer number.

Optionally, when it is determined, based on a frame number in the bitstream, that a second frame starts to be parsed, the decoder side sends the channel feedback information to the encoder side. The channel feedback information indicates a frame number of a first frame and a layer number of a highest layer of the received first frame, and the first frame is a previous frame of the second frame.

Optionally, when it is determined, based on the layer number of the received picture frame, that a first frame is completely received, the decoder side sends the channel feedback information to the encoder side. The channel feedback information indicates a frame number of the first frame and a layer number of a highest layer of the received first frame.

In this disclosure, a decoder side may send channel feedback information when learning, through parsing, that a bitstream of a next frame starts to be received (determined based on a frame number in the bitstream), where the channel feedback information carries a frame number of a previous frame and a highest layer number received in the previous frame. Alternatively, a decoder side may send channel feedback information when learning, through parsing, that the current picture is completely received (determined based on a highest layer number of the current picture in the bitstream), where the feedback information carries a frame number of the current picture and a highest layer number received in the current picture. The decoder side sends the channel feedback information in the foregoing two cases, to ensure that a highest layer that is received in any frame and that is obtained by an encoder side is consistent with a highest layer of the same frame actually received by the decoder side. This avoids a problem that an error occurs in encoding and decoding because different reference pictures are used at the encoder side.

In addition, the decoder side may further periodically send the channel feedback information to the encoder side. The channel feedback information carries a frame number and a layer number corresponding to a newly received bitstream. In this disclosure, the decoder side may further send the channel feedback information in another manner. This is not further limited.

In a possible implementation, when the current picture is a picture slice, the method further includes determining a picture slice number of the received picture frame, and correspondingly, the channel feedback information further indicates the picture slice number.

A frame of picture is divided into a plurality of picture slices for encoding and sending. When the current picture is the picture slice, the decoder side may determine a received picture slice number while determining a received frame number and layer number, and then adds the frame number of the received picture slice, the picture slice number, and the layer number corresponding to the picture slice number to the channel feedback information. The foregoing processing process based on a picture may be processed in a same way as that based on a picture slice.

The following describes the solutions in the foregoing method embodiments by using several specific embodiments.

Embodiment 1

Encoder Side:

1. The encoder side determines a total quantity of layers for scalable video encoding, sets a reference layer number set, and sends the total quantity of layers and the reference layer number set to a decoder side.

In this step, the reference layer number set is a reference layer number set selected by the encoder side when reference needs to be performed for encoding a frame of picture, and includes a to-be-referenced layer number, for example, a reference layer number set $Rx=\{1, 4, 6\}$ indicates that reconstructed pictures whose layer numbers are 1, 4, and 6 are referenced by subsequent picture frames and need to be reserved in a DPB. A layer number in the reference layer number set is not greater than a total quantity of layers $L_{max}$ for scalable encoding. When a layer number in the reference layer number set is greater than the total quantity of layers for scalable encoding, the layer number is ignored by the encoder side.

The reference layer number set is set by the encoder side, and a quantity of layer numbers in the reference layer number set is less than or equal to the total quantity of layers $L_{max}$. A setting method is not limited. For example, based on a chip capability, the quantity of layer numbers in the reference layer number set may be set not to exceed half of a maximum quantity of layers, and a layer number interval may be 2. If the total quantity of layers $L_{max}=6$, the reference layer number set $Rx=\{1, 3, 5\}$. Alternatively, the reference layer number set includes the total quantity of layers. If the maximum quantity of layers $L_{max}=6$, the reference layer number set $Rx=\{1, 3, 6\}$. Alternatively, dynamic setting is performed based on real-time encoding and network feedback.

The total quantity of layers and the reference layer number set may be sent to the decoder side in a form of a bitstream, or may be determined by the decoder side and the encoder side through negotiation. This is not limited in this disclosure.

Each frame may have an independent and different reference layer number set, or a group of/all picture frames may have a same reference layer number set. This is not limited herein.

2. The encoder side performs scalable encoding on a current picture, and stores a reconstructed picture based on the reference layer number set.

The encoder side obtains a frame of picture, encodes the picture based on the total quantity of layers in the step 1 and resolution scale or quality scale, and encodes the picture into a multi-level bitstream. When a layer number is in the reference layer number set, an encoded reconstructed picture of the layer is stored in the DPB for reference by a subsequent picture frame. For example, if the reference layer number set Rx is $\{1, 4, 6\}$, reconstructed pictures whose layer numbers are 1, 4, and 6 of the current picture are stored in the DPB.

3. Obtain channel feedback information, and encode the subsequent picture frame based on the channel feedback information and the reference layer number set.

The encoded scaled bitstream is transmitted over a network. The network may be a transmission network with a packet loss characteristic. Priorities may be sorted based on different levels of encoded bitstreams, and discarding is performed in ascending order of priorities. For example, a base layer bitstream has a highest priority, and it is necessary to ensure that the base layer bitstream can be successfully sent to the maximum extent. A higher enhancement layer indicates a lower priority of the enhancement layer and a lower priority of ensuring successful transmission. To ensure that bitstreams of levels with high priorities pass through, bitstreams of levels with low priorities may be actively discarded and not transmitted.

After transmission completion, the decoder side feeds back information about a received frame number and layer number. The information indicates a specific layer of a specific frame that is received. The transmission completion herein refers to an end moment of transmission within a period of time. For example, before a next frame is encoded, it indicates that transmission of a previous frame is completed. Alternatively, before an encoded bitstream of a next frame is sent to a transmission module, it indicates that transmission of a previous frame is completed. Alternatively, transmission of all layers of a previous frame is completed, it indicates that transmission of a previous frame is completed. This is not limited herein.

Before encoding the next frame, an encoder obtains the channel feedback information. A reference picture is obtained based on the frame number and the layer number that have been received by the decoder side and with reference to the layer number in the reference layer number set. Further, based on the frame number and the layer number that have been received by the decoder side, a frame number closest to the current picture is obtained, and a layer number that is in a reference layer number set of a picture frame corresponding to the frame number and that is less than the layer number and closest to the layer number is obtained. For example, if the decoder side receives a fifth layer of a previous frame, and a reference layer number set Rx of the previous frame is {1, 4, 6}, a reconstructed picture of a layer number 4 of the previous frame is used as a reference picture for encoding. Alternatively, when determining that a fifth layer of a received previous frame is less than a highest layer 6 in a reference layer number set of the previous frame, the encoder side may determine a specified frame number in a plurality of frame numbers indicated by the channel feedback information as a reference frame number. In this case, the reference frame number obtained is a frame that is confirmed to have been received by the decoder side. For example, when a third frame is encoded, if a frame number received by the decoder side includes a first frame, the first frame can be specified to be referenced.

4. Repeat the steps 2 and 3 until all pictures in a video are encoded and transmitted.

Decoder Side:

1. The decoder side obtains information about the total quantity of layers for scalable video encoding and the reference layer number set.

The decoder side may obtain the total quantity of layers and the reference layer number set by parsing the bitstream, or may determine the total quantity of layers and the reference layer number set through negotiation with the encoder side. This is not limited in this disclosure.

2. The decoder side obtains the scalable video bitstream for decoding, and places reconstructed pictures obtained through decoding in the DPB based on a layer number of each received frame and a reference layer number set of the frame.

After receiving the bitstream, the decoder side directly sends the bitstream to a decoder for decoding. The decoder side parses the bitstream, and performs decoding in an order from a low layer to a high layer to obtain a base layer and an enhancement layer of a frame of picture. After a reconstructed picture of a layer is obtained through decoding, whether the reconstructed picture of the layer needs to be sent to the DPB is determined based on a reference layer number set of the frame. Further, if a layer number of a decoded layer is in the reference layer number set of the frame, the reconstructed picture of the layer is placed in the DPB. If decoding is performed to a higher layer of the frame, and a layer number of the layer is also in the reference layer number set of the frame, a picture of the layer is placed in the DPB to replace a reconstructed picture that enters the DPB and that is of a low layer of the frame, and is referenced by a subsequent frame as a reference layer picture of the frame. The replacement herein may be rewriting and over-writing of picture data, and a storage space is reused. Alternatively, the layer may be marked as a reference layer in a form of annotation, the lower layer is marked as a non-reference layer, storage space of the reference layer is reserved, and storage space of the non-reference layer is released.

If the decoder side feeds back information about a received frame number and layer number, the decoder side feeds back that a frame number and a layer number corresponding to the frame have been received after obtaining all data that can be received in the frame. Alternatively, whenever the decoder side receives data of one layer of the frame, the decoder side may feed back that a frame number and a layer number corresponding to the frame have been received, and feed back the frame number and the layer number in ascending order of the layer numbers.

3. The decoder side completes decoding of a frame of data, obtains a reconstructed picture of a highest layer of the frame, and sends the picture to a display module for displaying.

Decoding of a frame of data is completed in two cases. In a first case, the decoder side receives a highest-layer bitstream of the frame and decodes to obtain the reconstructed picture of the highest layer of the frame. In this case, the picture may be directly sent to the display module. Herein, whether a layer is the highest layer of the frame may be determined by parsing level information in the bitstream, and determining whether a layer number of the layer is equal to the total quantity of layers. In a second case, the decoder side receives a non-highest-layer bitstream of the frame, obtains a reconstructed picture of the layer through decoding, and obtains that a bitstream to be decoded next is a base layer bitstream of a next frame. In this case, the reconstructed picture of the layer obtained through decoding is used as the reconstructed picture of the highest layer of the frame, and is sent to the display module.

It should be noted that, the reconstructed picture of the highest layer obtained in this step is not necessarily a reconstructed picture stored in the DPB. Only reconstructed pictures of levels whose layer numbers are located in the frame reference layer number set can be stored in the DPB.

4. Obtain a reference frame based on the decoded picture buffer, and decode a subsequent picture until all pictures are completed.

When an encoded frame needs to be used as a reference frame during decoding of the subsequent picture, a reconstructed picture of the frame entering the DPB is directly obtained for reference and decoding.

Before the subsequent picture is decoded, a reference layer number set of the picture may be obtained, to store a reconstructed picture of a corresponding layer in the DPB queue according to the step 2 after reconstructed pictures of different levels of the picture are obtained through decoding.

This embodiment includes the following technical effects.

(1) Because a reconstructed picture of a layer number stored in the DPB is specified, at the encoder side, a reconstructed picture of a non-specified layer number cannot be stored in the DPB, to reduce storage costs of the DPB.

(2) Both the encoder side and the decoder side do not need to perform a large number of write operations to write a reconstructed picture of an unnecessary layer to a data memory of the DPB, to reduce a write bandwidth and improve an encoding and decoding processing speed.

(3) The end-to-end encoding scheme is based on the channel feedback information. Therefore, even if a frame is lost, a phenomenon that artifact decoding or incorrect decoding is caused because the decoder side cannot find a reference picture does not occur, to improve subjective experience. In addition, the channel feedback information can well guide the encoder side to select the reference picture, and reference is performed by using a received good reference layer, to improve encoding and compression efficiency.

(4) A reconstructed layer picture sent by the decoder side to the DPB may be different from a picture sent for display, and the picture sent for display may be a picture whose layer number is greater than that of the reconstructed layer picture sent to the DPB and that has higher picture quality. Therefore, in this solution, the picture with higher picture quality can be sent for display. This ensures user's watching experience.

Embodiment 2

Encoder Side:

1. This step is the same as the step 1 of the encoder side in the embodiment 1.

In this embodiment, the encoder side sends a bitstream to a plurality of decoder sides after encoding. Therefore, a multipath connection is established between the encoder side and the plurality of decoder sides, and each path transmits a same bitstream.

2. This step is the same as the step 2 of the encoder side in the embodiment 1.

3. This step is the same as the step 3 of the encoder side in the embodiment 1, but there are some differences in terms of channel feedback information.

In this step, after transmission is completed, the encoder side needs to receive channel feedback information from all the decoder sides, that is, needs to obtain a receiving condition of a current picture at all the decoder sides, including frame numbers and layer numbers that have been received by all the decoder sides. Layer numbers of highest layers of a same frame received by different decoder sides may be different.

Before a next frame is encoded, a largest frame number among received common frame numbers in the channel feedback information from all the decoder sides is selected as a reference frame number based on the received frame numbers and layer numbers. In addition, a layer number that is in the reference layer number set of the frame and that is less than a target layer number (determined by using the foregoing method embodiment) and that is closest to the target layer number is used as a reference layer number.

The reference frame number and reference layer number used by the frame are encoded into the bitstream.

4. This step is the same as the step 4 of the encoder side in the embodiment 1.

Decoder Side:

1. This step is the same as the step 1 of the decoder side in the embodiment 1.

2. This step is the same as the step 1 of the decoder side in the embodiment 1. However, when reconstructed pictures of different layers of the picture are stored in the DPB, each decoder side needs to reserve reconstructed pictures of all layer numbers in the reference layer number set of the frame. An obtained reconstructed picture of a high layer cannot be used to replace the reconstructed picture of a low layer of the frame that enters the DPB because the decoder side cannot know a layer that is used as a reference layer for a subsequent picture frame.

3. This step is the same as the step 3 of the decoder side in the embodiment 1.

4. This step is the same as the step 4 of the decoder side in the embodiment 1.

Embodiment 3

This embodiment provides an example of syntax and semantics of a bitstream at an encoder side that is based on channel feedback information and that is based on a specified layer reference.

In the embodiment 1 and the embodiment 2, the encoder side needs to write a reference layer number set of each frame into a bitstream, and transmit a bitstream to a decoder side, so that the decoder side can obtain the information. In this embodiment, the bitstream information is not limited to being added to a bitstream of a standard protocol such as H.264 and H.265, and may also be added to a non-standard bitstream. In this embodiment, an H.265 standard bitstream is used as an example.

In a first example, a reference layer number set is encoded based on a picture parameter set (PPS). A syntax element indicating scalable encoding is added to the PPS, and a syntax element indicating a reference layer number set is added to the PPS. This is shown in the following table.

| | Descriptor |
|---|---|
| pic_parameter_set_rbsp( ) { | |
| ... | |
| pps_extension_present_flag | u(1) |
| if( pps_extension_present_flag ) { | |
| ... | |
| pps_shortrange_multilayer_flag | u(1) |
| } | |
| ... | |
| if( pps_shortrange_multilayer_flag ) { | |
| pps_candidate_reference_layer | u(8) |
| } | |
| rbsp_trailing_bits( ) | |
| } | |

Semantics of the new syntax elements are as follows.

pps_shortrange_multilayer_flag indicates to add a scalable encoding configuration parameter. When a value is 1, it indicates that a current picture sequence uses a scalable encoding method, and a syntax element for the scalable encoding method needs to be parsed. When a value is 0, it indicates that the syntax element is not used.

pps_candidate_reference_layer indicates a reference layer number set. After decoding a frame, a decoder needs to store a layer number of a reconstructed picture. The reconstructed picture enters into a DPB as a reference frame. In an example, the syntax may be eight bits, and each bit indicates a layer number of a layer. For example, bit 0 may represent a base layer, and bits 1 to 7 may respectively represent an enhancement layer 1 to an enhancement layer 7. The representation form herein is not limited. For example, a number of bits may be adjusted based on a highest layer number. If the highest layer number is greater than 8, the number of bits of the syntax may be more than 8.

A parsing and processing method by a decoder side is as follows.

The decoder side obtains a bitstream and parses PPS information pic_parameter_set_rbsp. When it is obtained, through parsing, that the element pps_extension_present_flag is 1, pps_shortrange_multilayer_flag is parsed. If it is obtained, through parsing, that pps_shortrange_multilayer_flag is 1, pps_candidate_reference_layer is further parsed. A value of the element is obtained, and a reference layer number set of the picture sequence may be constructed based on a value of each bit of the value of the element.

If it is obtained, through parsing, that the element pps_extension_present_flag is 0, pps_shortrange_multilayer_flag is not further parsed. If it is obtained, through parsing, that pps_shortrange_multilayer_flag is 0, pps_candidate_reference_layer is not further parsed. In this case, a decoder does not perform processing according to the method in the embodiment 1.

The reference layer number set of the picture sequence is not updated until the new pps_candidate_reference_layer syntax element is parsed.

In a second example, a reference layer number set is encoded based on a slice segment header (SSH). A syntax element indicating scalable encoding is added to the SSH, and a syntax element indicating a reference layer number set is added to a PPS. This is shown in the following table.

|  | Descriptor |
| --- | --- |
| slice_segment_header( ) { | |
| ... | |
| if( slice_segment_header_extention_present_flag ) { | |
| ... | |
|    ssh_shortrange_multilayer_flag | u(1) |
| } | |
| ... | |
|    if( ssh_shortrange_multilayer_flag ) { | |
|      ssh_candidate_reference_layer | u(8) |
|    } | |
|    byte_alignment( ) | |
| } | |

Semantics of the new syntax elements are as follows.

ssh_shortrange_multilayer_flag indicates to add a scalable encoding configuration parameter to a slice. When a value is 1, it indicates that a current picture slice uses a scalable encoding method, and a syntax element for the scalable encoding method corresponding to the slice needs to be parsed. When a value is 0, it indicates that the syntax element is not used.

ssh_candidate_reference_layer indicates a reference layer number set of the slice. After decoding the current slice, a decoder needs to store a layer number of a reconstructed picture. The reconstructed picture enters into a DPB as a reference frame. In an example, the syntax may be eight bits, and each bit indicates a layer number of a layer. For example, bit 0 may represent a base layer, and bits 1 to 7 may respectively represent an enhancement layer 1 to an enhancement layer 7. The representation form herein is not limited. For example, a number of bits may be adjusted based on a highest layer number. If the highest layer number is greater than 8, the number of bits of the syntax may be more than 8.

A parsing and processing method by a decoder side is similar to that in the first example, and a main difference lies in that information parsed in the part corresponds to a picture slice.

Figure 9:
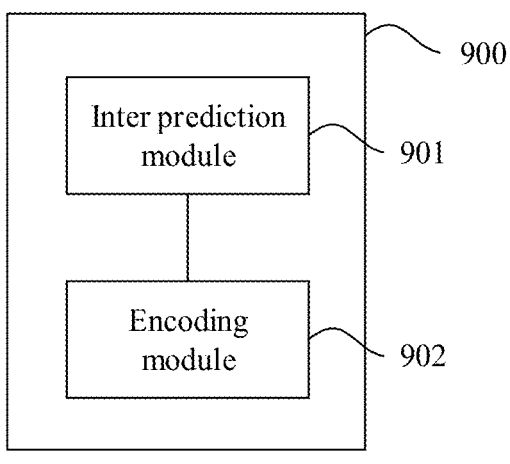
FIG. 9 is a schematic diagram of a structure of an encoding apparatus according to an embodiment of this disclosure.

FIG. 9 is a schematic diagram of a structure of an encoding apparatus 900 according to an embodiment of this disclosure. The encoding apparatus 900 includes an inter prediction module 901 and an encoding module 902.

The inter prediction module 901 is configured to determine a reference frame number of a current picture based on channel feedback information, where the channel feedback information indicates information about a picture frame received by a decoder side, obtain a first reference layer number set of a first picture frame corresponding to the reference frame number, where the first reference layer number set includes layer numbers of N1 layers, $1 \leq N1 < L1$, and L1 indicates a total quantity of layers of the first picture frame, and determine a reference layer number of the current picture based on the channel feedback information and the first reference layer number set. The encoding module 902 is configured to perform video encoding on the current picture based on the reference frame number and the reference layer number to obtain a bitstream.

In a possible implementation, the encoding module 902 is further configured to obtain, from a DPB, a reconstructed picture corresponding to the reference frame number and the reference layer number, where the DPB stores only reconstructed pictures of the N1 layers for the first picture frame, and use the obtained reconstructed picture corresponding to the reference frame number and the reference layer number as a reference picture, and perform video encoding on the current picture based on the reference picture to obtain the bitstream.

In a possible implementation, when there is only one decoder side, the inter prediction module 901 is further configured to obtain a plurality of pieces of channel feedback information, where the channel feedback information indicates a frame number of a picture frame received by the decoder side, and determine, as the reference frame number of the current picture, a frame number that is in a plurality of frame numbers indicated by the plurality of pieces of channel feedback information and that is closest to a frame number of the current picture.

In a possible implementation, the inter prediction module 901 is further configured to determine, as a target layer number, a highest layer number indicated by channel feedback information indicating the reference frame number, and when the first reference layer number set includes the target layer number, determine the target layer number as the reference layer number of the current picture, or when the first reference layer number set does not include the target layer number, determine, as the reference layer number of the current picture, a layer number that is in the first reference layer number set and that is less than and closest to the target layer number.

In a possible implementation, when there are a plurality of decoder sides, the inter prediction module 901 is further configured to obtain a plurality of groups of channel feedback information, where the plurality of groups of channel feedback information correspond to the plurality of decoder sides, each group of channel feedback information includes a plurality of pieces of channel feedback information, and the channel feedback information indicates a frame number of a picture frame received by a corresponding decoder side, determine one or more common frame numbers based on the plurality of groups of channel feedback information, where the common frame number is a frame number indicated by at least one piece of channel feedback information in each group of channel feedback information, and determine the reference frame number of the current picture based on the one or more common frame numbers.

In a possible implementation, the inter prediction module 901 is further configured to obtain a highest layer number indicated by channel feedback information that is in each of the plurality of groups of channel feedback information and that indicates the reference frame number, determine a smallest highest layer number among the plurality of highest layer numbers as a target layer number, and determine the reference layer number of the current picture based on the target layer number and the first reference layer number set.

In a possible implementation, the channel feedback information comes from a corresponding decoder side and/or a network device on a transmission link.

In a possible implementation, the channel feedback information is generated based on a sent bitstream.

In a possible implementation, the inter prediction module 901 is further configured to obtain a plurality of pieces of channel feedback information, where the channel feedback information indicates the frame number of the picture frame received by the decoder side, determine, as a target frame number, a frame number that is in a plurality of frame numbers indicated by the plurality of pieces of channel feedback information and that is closest to a frame number of the current picture, and when a highest layer number indicated by channel feedback information indicating the target frame number is greater than or equal to a highest layer number in a second reference layer number set, determine the target frame number as the reference frame number, where the second reference layer number set is a reference layer number set of a second picture frame corresponding to the target frame number.

In a possible implementation, the inter prediction module 901 is further configured to, when the highest layer number indicated by the channel feedback information indicating the target frame number is less than the highest layer number in the second reference layer number set, determine, as the reference frame number of the current picture, a specified frame number in the plurality of frame numbers indicated by the plurality of pieces of channel feedback information.

In a possible implementation, the inter prediction module 901 is further configured to, when the first reference layer number set does not include the target layer number, if the first reference layer number set does not include a layer number less than the target layer number, determine a reference frame number of a previous frame of the current picture as the reference frame number of the current picture, and determine a reference layer number of the previous frame as the reference layer number of the current picture.

In a possible implementation, the bitstream further includes the first reference layer number set.

In a possible implementation, the bitstream further includes the reference frame number.

In a possible implementation, the bitstream further includes the reference frame number and the reference layer number.

In a possible implementation, when the current picture is a picture slice, the inter prediction module 901 is further configured to determine that a picture slice number of the current picture is the same as a picture slice number of the picture frame received by the decoder side, and determine a layer number corresponding to the picture slice number of the picture frame received by the decoder side as the target layer number, and when the first reference layer number set includes the target layer number, determine the target layer number as the reference layer number of the current picture, or when the first reference layer number set does not include the target layer number, determine, as the reference layer number of the current picture, a layer number that is in the first reference layer number set and that is less than and closest to the target layer number.

Figure 10:
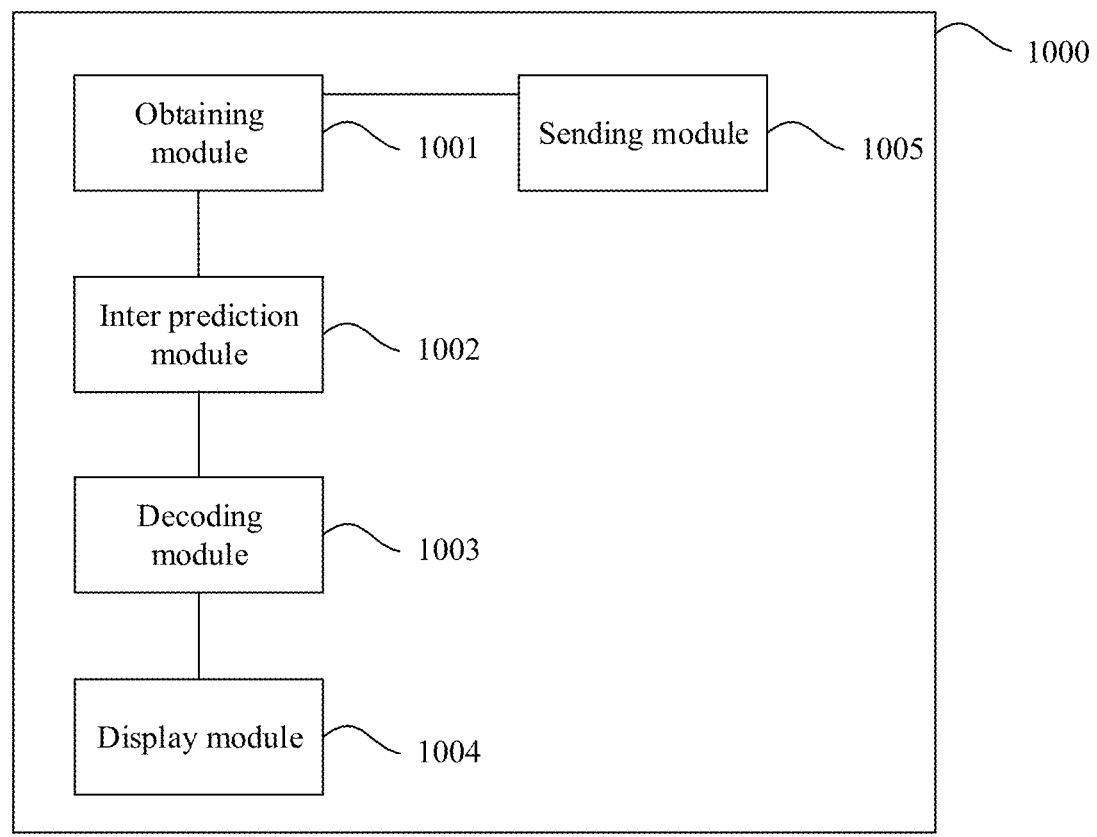
FIG. 10 is a schematic diagram of a structure of a decoding apparatus according to an embodiment of this disclosure.

FIG. 10 is a schematic diagram of a structure of a decoding apparatus 1000 according to an embodiment of this disclosure. The decoding apparatus 1000 includes an obtaining module 1001, an inter prediction module 1002, a decoding module 1003, a display module 1004, and a sending module 1005.

The obtaining module 1001 is configured to obtain a bitstream. The inter prediction module 1002 is configured to parse the bitstream to obtain a reference frame number of a current picture, obtain a third reference layer number set of a third picture frame corresponding to the reference frame number, where the third reference layer number set includes layer numbers of N2 layers, 1≤N2<L2, and L2 indicates a total quantity of layers of the third picture frame, and determine a reference layer number of the current picture based on the third reference layer number set. The decoding module 1003 is configured to perform video decoding based on the reference frame number and the reference layer number to obtain a reconstructed picture of the current picture.

In a possible implementation, the decoding module 1003 is further configured to obtain, from a DPB, a reconstructed picture corresponding to the reference frame number and the reference layer number, and use the obtained reconstructed picture corresponding to the reference frame number and the reference layer number as a reference picture, and perform video decoding based on the reference picture to obtain the reconstructed picture of the current picture.

In a possible implementation, the decoding module 1003 is further configured to store reconstructed pictures of N3 layers of the current picture in the DPB, where a fourth reference layer number set of the current picture includes layer numbers of M layers, the M layers include the N3 layers, 1≤M<L3, and L3 indicates a total quantity of layers of the current picture, or store a reconstructed picture of a highest layer among N3 layers in the DPB.

In a possible implementation, the display module 1004 is configured to display a reconstructed picture of an $L4^{th}$ layer of the current picture, where L4 indicates a layer number of a highest layer obtained by decoding the current picture.

In a possible implementation, the inter prediction module 1002 is further configured to determine a highest layer number among layer numbers respectively corresponding to a plurality of reconstructed pictures that are obtained through decoding and that are of the third picture frame, and when the third reference layer number set includes the highest layer number, determine the highest layer number as the reference layer number of the current picture, or when the reference layer number set does not include the highest layer number, determine, as the reference layer number of the current picture, a layer number that is in the third reference layer number set and that is less than and closest to the highest layer number.

In a possible implementation, the inter prediction module 1002 is further configured to, when the third reference layer number set does not include the highest layer number, if the third reference layer number set does not include a layer number less than the highest layer number, determine a reference frame number of a previous frame of the current picture as the reference frame number of the current picture, and determine a reference layer number of the previous frame as the reference layer number of the current picture.

In a possible implementation, the sending module 1005 is configured to determine a frame number and a layer number of a received picture frame, and send channel feedback information to an encoder side, where the channel feedback information indicates the frame number and the layer number of the received picture frame.

In a possible implementation, the sending module 1005 is further configured to, when it is determined, based on a frame number in the bitstream, that a second frame starts to be parsed, send the channel feedback information to the encoder side, where the channel feedback information indicates a frame number of a first frame and a layer number of a highest layer of the received first frame, and the first frame is a previous frame of the second frame, or when it is determined, based on the layer number of the received picture frame, that a first frame is completely received, send the channel feedback information to the encoder side, where the channel feedback information indicates a frame number of the first frame and a layer number of a highest layer of the received first frame.

In a possible implementation, when the current picture is a picture slice, the sending module 1005 is further configured to determine a picture slice number of the received picture frame, and correspondingly, the channel feedback information further indicates the picture slice number.

In an implementation process, the steps in the foregoing method embodiments may be implemented by an integrated logic circuit of hardware or instructions in a form of software in a processor. The processor may be a general-purpose processor, a DSP, an ASIC, an FPGA or another programmable logic device, a discrete gate or transistor logic device, or a discrete hardware component. The general-purpose processor may be a microprocessor, or the processor may be any conventional processor or the like. The steps of the methods disclosed in embodiments of this disclosure may be directly presented as being performed and completed by a hardware encoding processor, or performed and completed by a combination of hardware and a software module in an encoding processor. The software module may be located in a mature storage medium in the art, such as a RAM, a flash memory, a ROM, a programmable ROM (PROM), an electrically erasable PROM (EEPROM), or a register. The storage medium is located in a memory, and the processor reads information in the memory and completes the steps of the foregoing methods in combination with the hardware of the processor.

The memory mentioned in the foregoing embodiments may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM, used as an external cache. Through example but not limitative description, many forms of RAMs may be used, for example, a SRAM, a DRAM, a synchronous DRAM (SDRAM), a double data rate (DDR) SDRAM, an enhanced SDRAM (ESDRAM), a synchronous link (synchlink) DRAM (SLDRAM), and a direct Rambus (DR) RAM. It should be noted that the memory of the systems and methods described in this specification includes but is not limited to these and any memory of another proper type.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this disclosure, it should be understood that the disclosed systems, apparatuses, and methods may be implemented in other manners. For example, the foregoing described apparatus embodiments are merely examples. For example, division into the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in embodiments.

In addition, functional units in embodiments of this disclosure may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or a part contributing to the conventional technology, or some of the technical solutions may be implemented in a form of a software product. The software product is stored in a storage medium, and includes a plurality of instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. An encoder comprising:
a memory configured to store instructions; and
one or more processors coupled to the memory and configured to execute the instructions to cause the encoder to:
determine a first reference frame number of a current picture based on first channel feedback information, wherein the first channel feedback information indicates first information about a second picture frame of a decoder side;
obtain a first reference layer number set of a first picture frame corresponding to the first reference frame number, wherein the first reference layer number set comprises layer numbers of N1 layers, wherein $1 \leq N1 < L1$, and wherein L1 indicates a total quantity of layers of the first picture frame;
determine a first reference layer number of the current picture based on the first channel feedback information and the first reference layer number set;
obtain a reconstructed picture corresponding to the first reference frame number and the first reference layer number from a decoded picture buffer (DPB) that stores only reconstructed pictures of the N1 layers for the first picture frame;
set the reconstructed picture as a reference picture; and
perform video encoding on the current picture based on the reference picture to obtain a bitstream.

2. The encoder of claim 1, wherein the one or more processors are further configured to execute the instructions to cause the encoder to:
obtain pieces of the first channel feedback information, wherein the pieces indicate frame numbers, and wherein the first channel feedback information further indicates a first frame number of the second picture frame; and set a second frame number that is in the frame numbers and that is closest to a third frame number of the current picture as the first reference frame number.

3. The encoder of claim 2, wherein the one or more processors are further configured to execute the instructions to cause the encoder to:

determine a highest layer number from second channel feedback information indicating the first reference frame number as a target layer number;

set the target layer number as the first reference layer number when the first reference layer number set comprises the target layer number; and set a first layer number that is in the first reference layer number set and that is less than and closest to the target layer number as the first reference layer number when the first reference layer number set does not comprise the target layer number.

4. The encoder of claim 1, wherein the one or more processors are further configured to execute the instructions to cause the encoder to:

obtain groups of second channel feedback information corresponding to decoder sides, wherein each of the groups comprises pieces of third channel feedback information, and wherein the third channel feedback information indicates a first frame number of a third picture frame of a corresponding decoder side;

determine one or more common frame numbers based on the groups, wherein each of the one or more common frame numbers is indicated by at least one piece of the third channel feedback information in each of the groups; and determine the first reference frame number based on the one or more common frame numbers.

5. The encoder of claim 4, wherein the one or more processors are further configured to execute the instructions to cause the encoder to:

obtain a highest layer number indicated by fourth channel feedback information that is in each of the groups and that indicates the first reference frame number;

determine a smallest highest layer number among highest layer numbers as a target layer number; and further determine the first reference layer number based on the target layer number.

6. The encoder of claim 1, wherein the one or more processors are further configured to execute the instructions to cause the encoder to:

obtain pieces of second channel feedback information, wherein the second channel feedback information indicates a first frame number of the second picture frame;

determine a second frame number that is in frame numbers indicated by the pieces of the second channel feedback information and that is closest to a third frame number of the current picture as a target frame number; and set the target frame number as the first reference frame number when a first highest layer number indicated by third channel feedback information indicating the target frame number is greater than or equal to a second highest layer number in a second reference layer number set, wherein the second reference layer number set is of a third picture frame corresponding to the target frame number.

7. The encoder of claim 6, wherein the one or more processors are further configured to execute the instructions to cause the encoder to:

identify that the first highest layer number is less than the second highest layer number; and set, in response to identifying that the first highest layer number is less than the second highest layer number, a fourth frame number in the frame numbers as the first reference frame number.

8. The encoder of claim 3, wherein the one or more processors are further configured to execute the instructions to cause the encoder to:

identify that the first reference layer number set does not comprise the target layer number and a second layer number less than the target layer number; and in response to identifying that the first reference layer number set does not comprise the target layer number and the second layer number less than the target layer number:

set a second reference frame number of a previous frame of the current picture as the first reference frame number; and set a second reference layer number of the previous frame as the first reference layer number.

9. The encoder of claim 1, wherein the current picture is a picture slice, wherein the first channel feedback information comprises a first picture slice number of the second picture frame and a first layer number corresponding to the first picture slice number, and wherein the one or more processors are further configured to execute the instructions to cause the encoder to:

set the first layer number as a target layer number when a second picture slice number of the current picture is the same as the first picture slice number;

set the target layer number as the first reference layer number when the first reference layer number set comprises the target layer number; and set a second layer number that is in the first reference layer number set and that is less than and closest to the target layer number as the first reference layer number when the first reference layer number set does not comprise the target layer number.

10. A decoder comprising:

a memory configured to store instructions; and one or more processors coupled to the memory and configured to execute the instructions to cause the decoder to:

obtain a bitstream;

parse the bitstream to obtain a first reference frame number of a current picture;

obtain a first reference layer number set of a first picture frame corresponding to the first reference frame number, wherein the first reference layer number set comprises layer numbers of N2 layers, wherein $1 \leq N2 < L2$, and wherein L2 indicates a first total quantity of layers of the first picture frame;

determine a first reference layer number of the current picture based on the first reference layer number set;

obtain a reconstructed picture corresponding to the first reference frame number and the first reference layer number from a decoded picture buffer (DPB) that stores only reconstructed pictures of the N2 layers for the first picture frame;

set the reconstructed picture as a reference picture; and perform video decoding based on the reference picture to obtain a first reconstructed picture of the current picture.

11. The decoder of claim 10, wherein the one or more processors are further configured to execute the instructions to cause the decoder to:

store reconstructed pictures of N3 layers of the current picture in the DPB, wherein a second reference layer number set of the current picture comprises layer numbers of M layers, wherein the M layers comprise the N3 layers, wherein $1 \leq M < L3$, and wherein L3 indicates a second total quantity of layers of the current picture; or store a second reconstructed picture of a highest layer among the N3 layers in the DPB.

12. The decoder of claim 11, wherein the one or more processors are further configured to execute the instructions to cause the decoder to display a third reconstructed picture of an $L4^{th}$ layer of the current picture, and wherein L4 indicates a layer number of a highest layer from decoding the current picture.

13. The decoder of claim 10, wherein the one or more processors are further configured to execute the instructions to cause the decoder to:

determine a highest layer number among layer numbers corresponding to reconstructed pictures that are from decoding and that are of the first picture frame;

set the highest layer number as the first reference layer number when the first reference layer number set comprises the highest layer number; and set a first layer number that is in the first reference layer number set and that is less than and closest to the highest layer number as the first reference layer number when the first reference layer number set does not comprise the highest layer number.

14. The decoder of claim 13, wherein the one or more processors are further configured to execute the instructions to cause the decoder to:

identify that the first reference layer number set does not comprise the highest layer number and a second layer number less than the highest layer number; and in response to identifying that the first reference layer number set does not comprise the highest layer number and the second layer number:

set a second reference frame number of a previous frame of the current picture as the first reference frame number; and set a second reference layer number of the previous frame as the first reference layer number.

15. The decoder of claim 10, wherein the one or more processors are further configured to execute the instructions to cause the decoder to:

determine a first frame number and a first layer number of a received picture frame; and send channel feedback information to an encoder side, wherein the channel feedback information indicates the first frame number and the first layer number.

16. The decoder of claim 15, wherein the one or more processors are further configured to execute the instructions to cause the decoder to further send the channel feedback information to the encoder side when it is determined, based on a second frame number in the bitstream, that a second frame starts to be parsed, wherein the channel feedback information further indicates a third frame number of a first frame and a second layer number of a highest layer of the first frame, and wherein the first frame is a previous frame of the second frame.

17. The decoder of claim 15, wherein the one or more processors are further configured to execute the instructions to cause the decoder to further send the channel feedback information to the encoder side when it is determined, based on the first layer number, that a first frame is completely received, and wherein the first frame is a previous frame of a second frame.

18. A method comprising:

determining a reference frame number of a current picture based on first channel feedback information, wherein the first channel feedback information indicates first information about a second picture frame of a decoder side;

obtaining a reference layer number set of a first picture frame corresponding to the reference frame number, wherein the reference layer number set comprises layer numbers of N1 layers, wherein $1 \leq N1 < L1$, and wherein L1 indicates a total quantity of layers of the first picture frame;

determining a reference layer number of the current picture based on the first channel feedback information and the reference layer number set;

obtaining a reconstructed picture corresponding to the reference frame number and the reference layer number from a decoded picture buffer (DPB) storing only reconstructed pictures of the N1 layers for the first picture frame;

setting the reconstructed picture as a reference picture; and performing video encoding on the current picture based on the reference picture to obtain a bitstream.

19. The method of claim 18, further comprising:

obtaining pieces of the first channel feedback information, wherein the pieces indicate frame numbers, and wherein the first channel feedback information further indicates a first frame number of the second picture frame; and setting a second frame number that is in the frame numbers and that is closest to a third frame number of the current picture as the reference frame number.

20. The method of claim 19, further comprising:

determining a highest layer number from second channel feedback information indicating the reference frame number as a target layer number;

setting the target layer number as the reference layer number when the reference layer number set comprises the target layer number; and setting a layer number that is in the reference layer number set and that is less than and closest to the target layer number as the reference layer number when the reference layer number set does not comprise the target layer number.

\* \* \* \* \*